United States Patent
Lin et al.

(10) Patent No.: US 11,507,678 B2
(45) Date of Patent: Nov. 22, 2022

(54) METHOD FOR MANAGING THE ACCESS AUTHORITY TO CLOUD STORAGE AND THE SYSTEM THEREFOR

(71) Applicant: Infortrend Technology, Inc., New Taipei (TW)

(72) Inventors: Yen-Jui Lin, New Taipei (TW); Zih-You Peng, New Taipei (TW); Chao-Feng Lin, New Taipei (TW)

(73) Assignee: Infortrend Technology, Inc., New Taipei (TW)

(*) Notice: Subject to any disclaimer, the term of this patent is extended or adjusted under 35 U.S.C. 154(b) by 667 days.

(21) Appl. No.: 16/423,170

(22) Filed: May 28, 2019

(65) Prior Publication Data
US 2020/0019718 A1    Jan. 16, 2020

Related U.S. Application Data

(60) Provisional application No. 62/677,190, filed on May 29, 2018.

(51) Int. Cl.
| | | |
|---|---|---|
| G06F 21/62 | (2013.01) | |
| H04L 67/1097 | (2022.01) | |
| H04L 9/40 | (2022.01) | |
| G06F 9/54 | (2006.01) | |
| H04L 61/45 | (2022.01) | |

(52) U.S. Cl.
CPC .......... *G06F 21/6218* (2013.01); *G06F 9/547* (2013.01); *H04L 61/457* (2022.05); *H04L 63/105* (2013.01); *H04L 67/1097* (2013.01)

(58) Field of Classification Search
CPC . G06F 21/6218; G06F 9/547; H04L 61/1582; H04L 63/105; H04L 67/1097
See application file for complete search history.

(56) References Cited

FOREIGN PATENT DOCUMENTS

| CN | 106127064 A | * 11/2016 |
|---|---|---|
| TW | 201602802 A | 1/2016 |
| TW | 201607358 A | 2/2016 |
| TW | 201617963 A | 5/2016 |
| TW | 201635164 A | 10/2016 |
| TW | 201635760 A | 10/2016 |

(Continued)

*Primary Examiner* — Matthew Smithers
*Assistant Examiner* — Shu Chun Gao
(74) *Attorney, Agent, or Firm* — Winston Hsu

(57) ABSTRACT

The present invention discloses a method for managing cloud service authority in a cloud storage system, which includes: a set of cloud data and a plurality of data servers. The cloud data includes a plurality of user object files and global access control information. Each data server includes an access control enforcement unit for executing or rejecting I/O requests from the client computers, where the access control enforcement unit includes local access control information. The method includes steps of: changing the content of the global access control information in the cloud data; downloading, by the data servers, the changed global access control information from the cloud data; updating, by the data servers, the local access control information therein according to the downloaded global access control information; and processing, by the data servers, I/O requests from the client computers according to the updated local access control information.

44 Claims, 25 Drawing Sheets

(56) References Cited

FOREIGN PATENT DOCUMENTS

| | | |
|---|---|---|
| TW | 201701169 A | 1/2017 |
| TW | 201710902 A | 3/2017 |
| TW | 201710937 A | 3/2017 |
| TW | 201717046 A | 5/2017 |
| TW | 201721437 A | 6/2017 |
| TW | 201728124 A | 8/2017 |
| TW | 201729121 A | 8/2017 |
| TW | 201811093 A | 3/2018 |
| TW | 201812610 A | 4/2018 |
| TW | 201816624 A | 5/2018 |
| WO | WO-2015069234 A1 * | 5/2015 ............. G06F 21/31 |

* cited by examiner

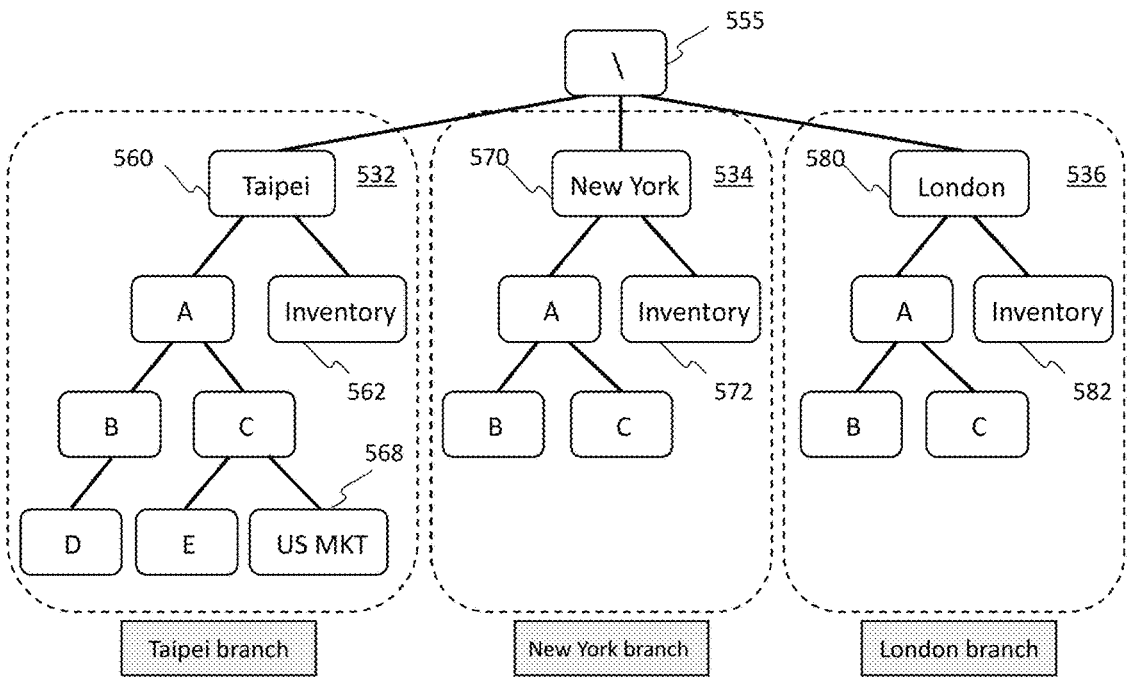

Fig. 5A

| Data Server ID | Folder Name | Access Right |
|---|---|---|
| Data_Server_A | \Taipei | Read and Write |
| Data_Server_A | \New York\Inventory | Read Only |
| Data_Server_A | \London\Inventory | Read Only |
| Data_Server_B | \New York | Read and Write |
| Data_Server_B | \Taipei\Inventory | Read Only |
| Data_Server_B | \London\Inventory | Read Only |
| Data_Server_C | \London | Read and Write |
| Data_Server_C | \Taipei\Inventory | Read Only |
| Data_Server_C | \New York\Inventory | Read Only |

Fig. 5B

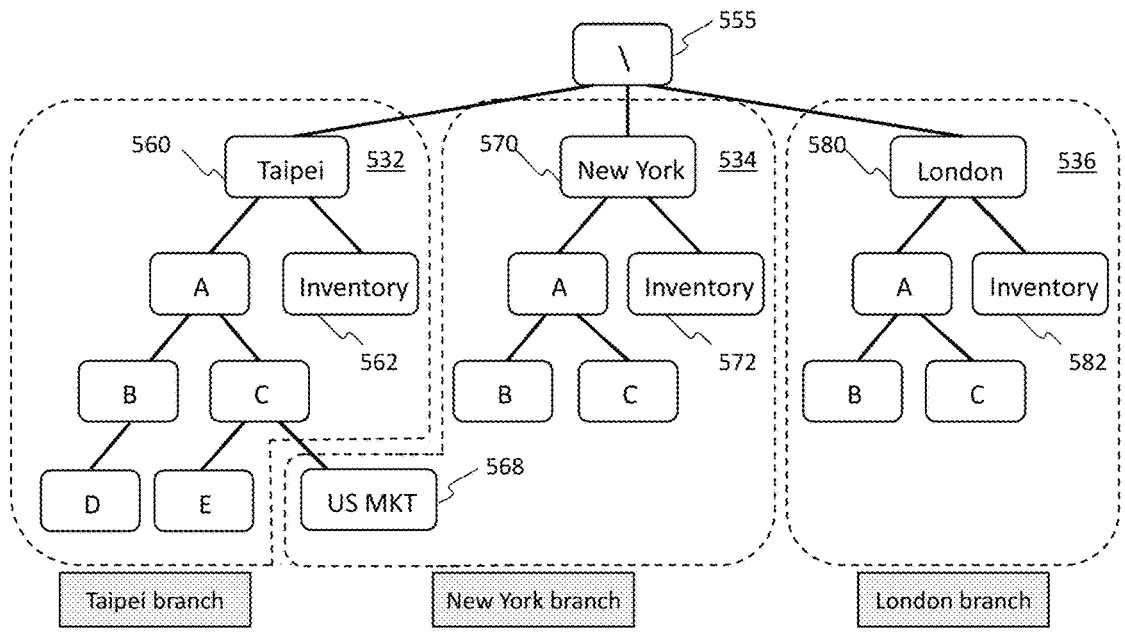

Fig. 6A

| Data Server ID | Folder Name | Access Right |
|---|---|---|
| Data_Server_A | \Taipei | Read and Write |
| Data_Server_A | \New York\Inventory | Read Only |
| Data_Server_A | \London\Inventory | Read Only |
| Data_Server_A | \Taipei\A\C\US MKT | Read Only |
| Data_Server_B | \New York | Read and Write |
| Data_Server_B | \Taipei\Inventory | Read Only |
| Data_Server_B | \London\Inventory | Read Only |
| Data_Server_B | \Taipei\A\C\US MKT | Read and Write |
| Data_Server_C | \London | Read and Write |
| Data_Server_C | \Taipei\Inventory | Read Only |
| Data_Server_C | \New York\Inventory | Read Only |

| Data Server ID | Folder Name | Access Right |
|---|---|---|
| Data_Server_A | \Taipei | Read and Write |
| Data_Server_A | \New York\Inventory | Read Only |
| Data_Server_A | \London\Inventory | Read Only |
| Data_Server_A | \Taipei\A\C\US MKT | Read Only |

535B

| Data Server ID | Folder Name | Access Right |
|---|---|---|
| Data_Server_B | \New York | Read and Write |
| Data_Server_B | \Taipei\Inventory | Read Only |
| Data_Server_B | \London\Inventory | Read Only |
| Data_Server_B | \Taipei\A\C\US MKT | Read and Write |

535C

| Data Server ID | Folder Name | Access Right |
|---|---|---|
| Data_Server_C | \London | Read and Write |
| Data_Server_C | \Taipei\Inventory | Read Only |
| Data_Server_C | \New York\Inventory | Read Only |

Fig. 6C

METHOD FOR MANAGING THE ACCESS AUTHORITY TO CLOUD STORAGE AND THE SYSTEM THEREFOR

CROSS REFERENCE TO RELATED APPLICATION

This application claims the benefit of U.S. Provisional Patent Application No. 62/677,190, filed May 29, 2018, which is incorporated by reference herein in its entirety.

BACKGROUND OF THE INVENTION

1. Field of the Invention

The present invention relates to a method and system for managing an access authority to cloud file data and more particularly, to a method and system for managing access right to files in a folder.

2. Description of the Prior Art

Please refer to FIG. 1A that shows a block diagram of a cloud data storage system 10 in the prior art. The cloud data storage system 10 in FIG. 1A includes a cloud storage unit 25 and a plurality of data servers 20.

In FIG. 1A, the cloud storage unit 25 is a cloud data storage environment (i.e., cloud environment) that cloud providers in ordinary market provide to clients. The cloud providers can be for example, business organizations such as Amazon, Google, Alibaba, and so on, for providing cloud storage space to the clients. The cloud storage unit 25 includes a central data management server 30, a cloud application programming interface 35 and a plurality of object files 40.

In the cloud environment, the central data management server 30 in the cloud storage unit 25 is a virtual machine (VM), and the virtual machine executes an operating system (OS) in order to manage a plurality of object files 40 in the cloud. When any one of the data server units 20 is going to make data access (read/write) to the object files 40 in the cloud, the one data server unit 20 firstly issues a read/write request to the central data management server 30 through the cloud application programming interface (API) 35, and then the central data management server 30 handles the read/write request through a central management mechanism (CMM) in the central data management server 30, so that each of the data server units 20 can correctly access the object files 40 in the cloud storage unit 25. Since there could be many read/write requests from the data server units 20, the execution performance of the central data management server 30 may be a bottleneck in the overall system performance. In addition, there is an access control list (ACL) stored in the central data management server 30. Before the data server units 20 handle the read/write requests from client computers, the data sever units 20 will inquire the central data management server 30, and then the central data management server 30 will check the access control list (ACL) to determine whether the read/write requests from the client computers can be executed or not.

The object files 40 of the cloud storage unit 25 are not much different from the file type under ordinary operating systems. The file names of the object files 40 can be the types of file names with file paths, and through the analysis of the data server units 20, he corresponding relationships between the files and their folders can be known. The object files 40 in the cloud data storage system 10 are regarded as the secondary data, and the data stored in the data server units 20 are regarded as the primary data. As to a specific file requested by a read/write request issued from client computers, when the data server units 20 cannot find that specific file in its internal storage space, the data sever units 20 will search for that specific file within the object files 40 of the cloud storage unit 25.

When transmitting data, the cloud API 35 of the cloud storage unit 25 is the data access interface for command communication between the plurality of data server units 20 and the cloud storage unit 25. The cloud API 35 is provided by the cloud provider, and users have to develop, according to instructions and specifications provided by the cloud provider, the interface for application programs to make data access to the cloud storage space, so that the users can correctly access data through the application programs from the cloud storage unit 25.

In FIG. 1A, the data sever unit 20 can be a server with a network function, or a network attached storage (NAS), or other devices that are equipped with similar network functions, which execute an operating system internally and are also coupled to the client computers (not shown). The data server units 20 accept I/O requests and request the cloud to send back the associated data requested by a read request, or send the write data of a write request into the cloud storage unit 25 for storing the write data.

When the data server units 20 need to read data from or write data into the object files 40 in the cloud storage unit 25, the data server units 20 will inquire the central data management server 30 through the cloud API 35, and determine whether the read/write requests should be executed, in which the determination of whether to execute the read/write requests is made according to an access control table stored in the central data management server 30. These inquiries made by the data server units 20 for determining whether or not to access the inquiring object files 40 from the cloud storage unit 25 will take the central data management server 30 much time and resources, so that the entire performance of the cloud data storage system 10 may be poor.

Moreover, because the central data management server 30 is a virtual server, the users for the cloud storage space have to rent such a service from the provider of the cloud storage unit 25, and the users have to pay extra expenses for renting the virtual server, which will increase the cost of the entire system.

Please refer to FIG. 1B which is a block diagram that shows another kind of the cloud data storage system 10 in the prior art. The difference between FIG. 1A and FIG. 1B is that there is no central data management server 30 in FIG. 1B. Therefore, when one of the data server units 20 is going to read the object files 40 from the cloud storage unit 25 or to write data into the cloud storage unit 25, it is not necessary for the read/write requests to be handled by the central data management server 30 for central processing; therefore, the time for inquiring the central data management server 30 in advance can be saved, the bottleneck of the system caused by the central data management server 30 can be avoided, and the cost for renting the virtual server can also be saved. However, such a method may cause a write error when two of data server units 20 are going to write data into the same object file TG 42 in the cloud storage unit 25 at the same time as shown in FIG. 1B. In order to solve such a problem, the solution in the prior art provides direct communication among the data server units 20, each of which has to communicate with one another through passing down a handshaking message 45 in order to make sure that there are no two or more data server units 20 going to write data into the same object file at the same time, so that the write error can be avoided. Taking FIG. 1B with two data server units 20 as an example, every time when one of the data server units 20 is going to write data into one of the object files 40 in the cloud storage space, the one of the data server unit 20 has to communicate with the other data server unit 20 in order to make sure that the other data server unit 20 is not going to write data into the same object file 40 at the same time. However, there are only two data server units 20 depicted in FIG. 1B, so the handshaking message 45 is just delivered between the two data server units 20. If the number of the data server units 20 in FIG. 1B is increased to ten, it means that one of the ten data server units 20 has to deliver the handshaking messages 45 to the other nine data server units 20 and has to get response handshaking messages 45 from the other nine data server units 20, and then the one of the ten data server units 20 can be sure that at this moment, the target object file 40 is not being written by any other data server units 20, and then it can send out the write request to write data into that object file 40. The aforesaid descriptions are only for one data access to a single object file 40. When a plurality of the data server units 20 make data access to a plurality of object files 40 multiple times, the number of handshaking messages 45 delivered among the data server units 20 will be huge, or even countless. Accordingly, in FIG. 1B, the overall performance of the cloud data storage system 10 will be reduced due to handling these countless handshaking messages 45 delivered among the data server units 20.

In order to solve the disadvantages in the prior art as shown in FIG. 1A and FIG. 1B, it is the object of the present invention to provide a simple and efficient architecture used to manage the data access from the data server unit 20 to the cloud storage unit 25 so as to improve the overall system performance.

SUMMARY OF THE INVENTION

It is one of the object of the present invention to provide a cloud data storage system for managing access authority to a cloud storage, comprising: a plurality of data servers for receiving at least one input/output request (I/O request) from at least one client computer and for serving the at least one I/O request, where each of the plurality of data servers comprises: a central processing unit for processing the at least one I/O request from the at least one client computer and for processing associated data; a memory unit for temporarily storing the at least one I/O request from the at least one client computer and the associated data; and an access control enforcement unit that executes or rejects the at least one I/O request from the at least one client computer, and comprises a set of local access control information; a set of cloud data that is located in a cloud storage unit, the set of cloud data comprises: a plurality of user object files for being accessed by the plurality of data servers in order to serve the at least one I/O request from the at least one client computer, where each of the plurality of user object files respectively corresponds to one of a plurality of folders, and the plurality of folders belong to file systems of the plurality of data servers; and a plurality of metadata object files comprising a set of global access control information and plural sets of status data, for being used by the plurality of data servers, wherein the global access control information is used to record corresponding relationships regarding access rights for the plurality of data servers to the plurality of folders, and each of the plural sets of status data represents a corresponding relationship between one of the plurality of data servers and one of the plurality of folders; wherein when content of the global access control information is changed, among the plurality of data servers a first data server that is associated with the change detects the disappearance of a first set of status data among the plural sets status data, in which the first set of status data is associated with the first data server, and the first data server downloads the global access control information from the cloud storage unit in order to update the local access control information of first data server, and handles the at least one I/O request from the at least one client computer according to the updated local access control information.

It is another object of the present invention to provide a method for managing access authority to a cloud storage in a cloud data storage system which comprises a plurality of data servers, a set of cloud data located in a cloud storage unit, and a network that is connected to the plurality of data servers and to the cloud data, comprising steps of: storing a plurality of user object files into the cloud data for being accessed by the plurality of data servers and for serving an I/O request from a client computer, wherein each of the plurality of user object files respectively corresponds to one of a plurality of folders, and the plurality of folders belong to file systems of the plurality of data servers; storing a plurality of metadata object files into the cloud data that comprise a set of global access control information and plural sets of status data, wherein the global access control information is used to record corresponding relationships regarding access rights for the plurality of data servers to the plurality of folders, and each of the plural sets of status data represents a corresponding relationship between one of the plurality of data servers and one of the plurality of folders; changing the content of the global access control information; deleting a first set of status data from the plural sets of status data, wherein the first set of status data represents a corresponding relationship between a first data server of the plurality of data servers and a first folder of the plurality of folders; downloading the global access control information from the cloud storage unit and updating, according to the downloaded global access control information, a local access control information in the first data server; and handling the I/O request from the client computer according to the updated local access control information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5A shows an example of architecture 1 depicting the specific folders and their sub-folders under root directories for each of the branches according to one embodiment of the present invention.

FIG. 5B shows the content of the global access control information according to the embodiment in FIG. 5A.

FIG. 6A shows an example of architecture 2 depicting the specific folders and their sub-folders under root directories for each of the branches according to one embodiment of the present invention.

FIG. 6B shows the content of the global access control information according to the embodiment in FIG. 6A.

FIG. 6C shows the content of the local access control information for each data server according to the embodiment in FIG. 6B.

DETAILED DESCRIPTION

Figure 2:
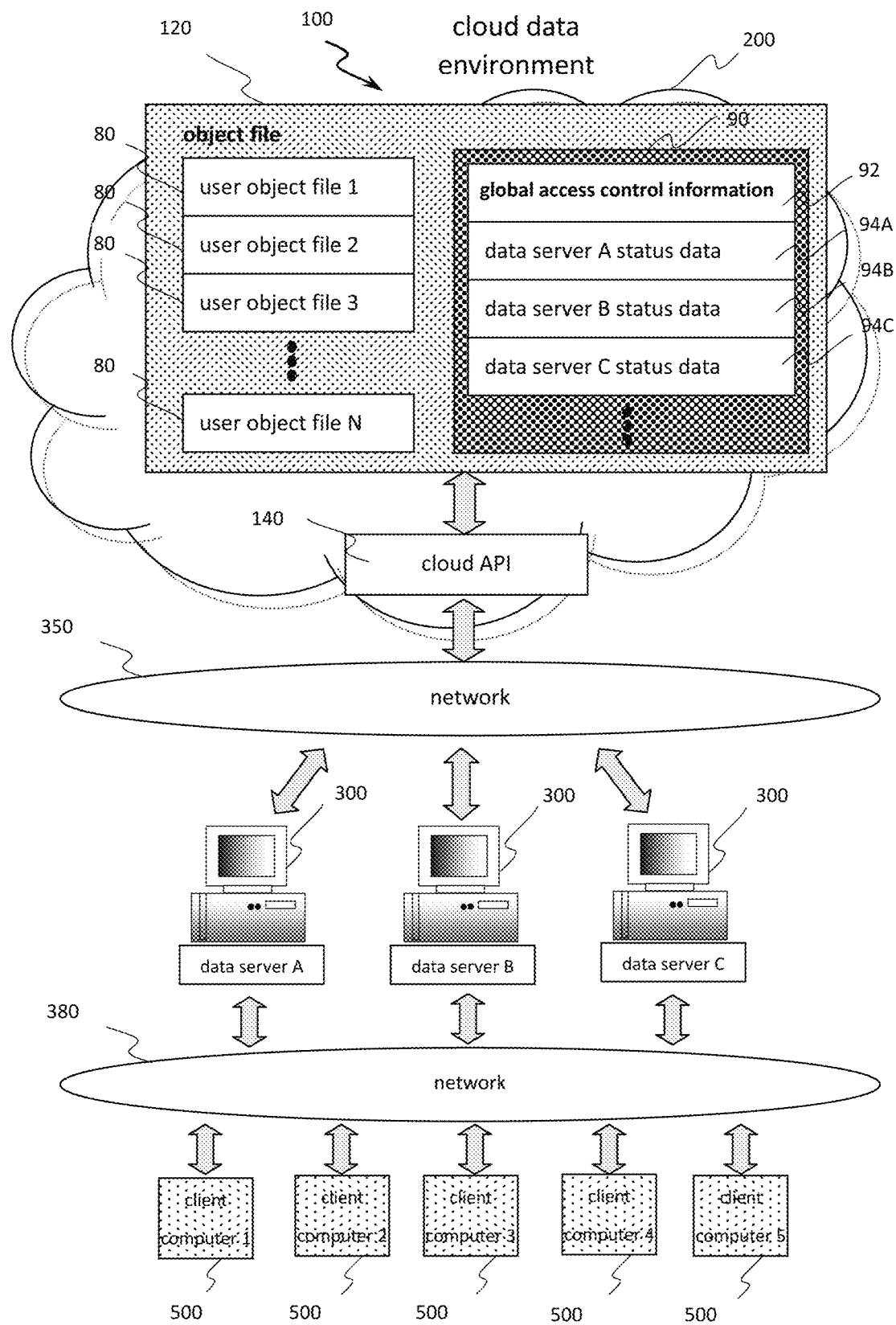
FIG. 2 shows an architecture diagram of a cloud data storage system according to one embodiment of the present invention.

Please refer to FIG. 2 which shows an architecture diagram of a cloud data storage system 100 according to one embodiment of the present invention. The cloud data storage system (CDSS) 100 in FIG. 2 mainly includes a cloud storage unit 200 and a plurality of data servers 300 which are coupled to the cloud storage unit 200 through a network 350. The client computers 500 are coupled to the data servers 300 through a network 380 and make data access to the data in the cloud storage unit 200 through the data servers 300.

In FIG. 2, the cloud storage unit 200 stores the cloud data 120 and has a cloud application programming interface (cloud API) 140. The cloud data 120 includes a plurality of object files which are further classified into two sorts, i.e., the user object files 80 and the meta data object files 90, where the user object files 80 are user data which are established and accessed by one or more client computer(s) 500 through one or more data server(s) 300; the meta data object files 90 are the object files which are exclusively used by the one or more data server(s) 300. The meta data object files 90 can be further classified into global access control information 92 and into plural sets of status data 94A, 94B, and 94C. Each of the plural sets of status data 94A, 94B, and 94C respectively represents a corresponding relationship between one of the data servers 300 and its associated folder. The aforesaid global access control information 92 and the plural sets of status data 94A to 94C and so on may be presented in multiple metadata files 90 respectively. According to another embodiment of the present invention, the aforesaid global access control information 92 and the plural sets of status data 94A to 94C can be collected and present in the same metadata object file 90.

When transmitting data, the cloud API 140 in the cloud storage unit 200 is a data access interface that helps communication between the plurality of data servers 300 and the cloud storage unit 200. The cloud API 140 is provided by the cloud provider, and the users for the cloud storage space may develop, by obeying the commands and specifications provided by the cloud provider, application programs as an interface for data access, so that the application programs executed by the users can correctly access the data from the cloud environment. For the cloud data storage system 100 in FIG. 2, the cloud storage unit 200 is secondary data storage space.

In FIG. 2, the plurality of data servers 300 are coupled to the cloud storage unit 200 through the network 350, where the network 350 can be an internet or a local area network (LAN). The plurality of client computers 500 are coupled to the data servers 300 through another network 380. The network 380 can be an internet or a local area network (LAN). According to another embodiment of the present invention, the network 350 and the network 380 can be the same one. Although in FIG. 2, the plurality of data servers 300 are not through the network 350 directly coupled to one another for communication, according to another embodiment of the present invention, the plurality of data servers 300 may directly or indirectly communicate with one another through network or other electrical connection.

In FIG. 2, the plurality of client computer 500; when one of the data servers 300 receives a write request from one of the client computers 500, that one data server 300 will firstly store the associated write data into itself and then send the write data to the cloud storage unit 200 for storing.

In FIG. 2, the client computers 500 can be general computers or other servers, which send I/O requests to the plurality of data servers 300 and wait for execution results of the I/O requests sent back by the data servers 300.

Figure 3B:
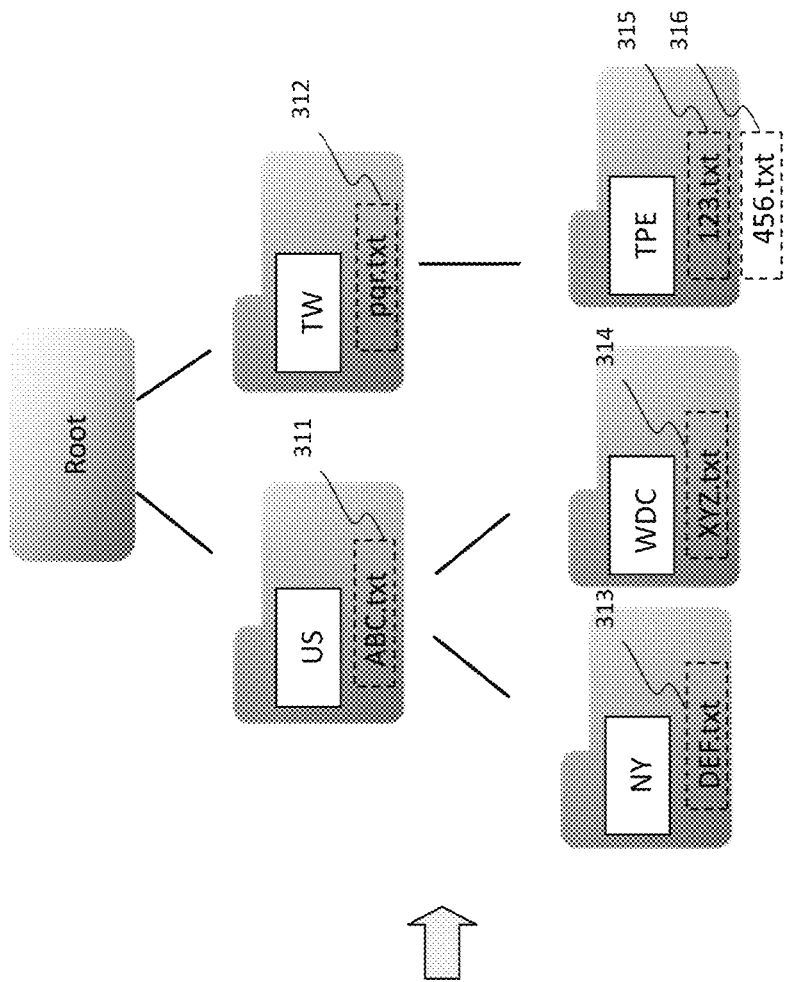
FIG. 3B shows the folder structure in which the object files correspond to an ordinary file system according to the embodiment in FIG. 3A of the present invention.
Figure 3A:
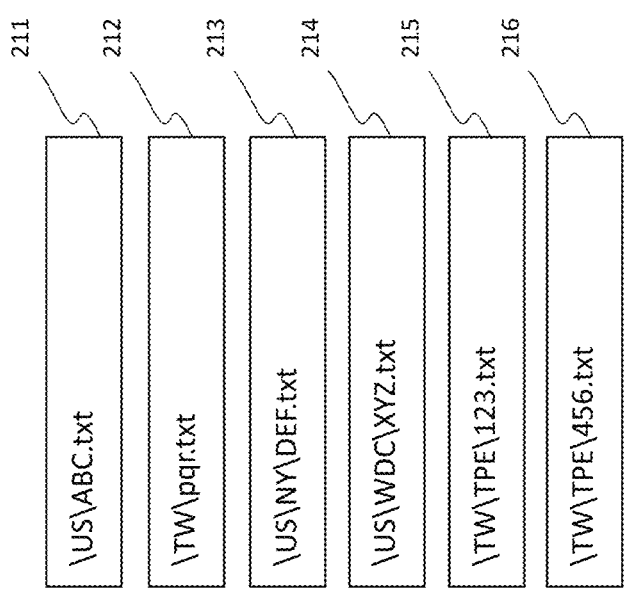
FIG. 3A shows an example of the file names of a plurality of objects files.

Please refer to FIG. 3A and FIG. 3B. According to one embodiment of the present invention, FIG. 3A and FIG. 3B show the corresponding relationships between object files in the cloud data 120 and the folder structure of the file system in a general operating system (OS). FIG. 3A shows six file names of the object files which are present as a folder structure as shown in FIG. 3B after the data server 300 analyzes and transforms. The file names of the object files 211 to 216 in FIG. 3A are different from the files under ordinary operating systems. In each of object files, the file names (main file names and file name extensions) after "\" on the most right-hand side are the file names in the ordinary operating systems, while all texts including one or more "\" before "\" on the most right-hand side are always seen as a "path" which is deemed as the directory to store the file in the file system. Therefore, in FIG. 3A, the file name "\US\ABC.txt" of the object file 211 is translated, by the data servers 300, into a file with a file name "ABC.txt" in a "US" folder under the root directory, in which the file "ABC.txt" corresponds to the file 311 (ABC.txt) in FIG. 3B. The file name "\TW\pqr.txt" of the object file 212 in FIG. 3A is translated, by the data servers 300, into a file with a file name "pqr.txt" in a "TW" folder under the root directory, in which the file "pqr.txt" corresponds to the file 312 (pqr.txt) in FIG. 3B. Likewise, the rest of the object files 213 to 216 in FIG. 3A are transformed, by the data servers 300, into the files 313 to 316 in FIG. 3B according to the similar translation rule.

Although the object files 211 to 216 in FIG. 3A, the symbol of "\" is used to interpret the relationships of the folder structures for the data servers' 300 recognition under the ordinary operating systems, according to another embodiment of the present invention, it is not limited to "\" but also can be other symbols, for example, one or more of "@", "|", "\\", "\\\", "~~" and so on, to replace "\" to represent the relationships of the folder structures for the data servers' 300 recognition under the ordinary operating systems, as long as these symbols comply with file naming rules provided by the cloud provider.

Figure 4B:
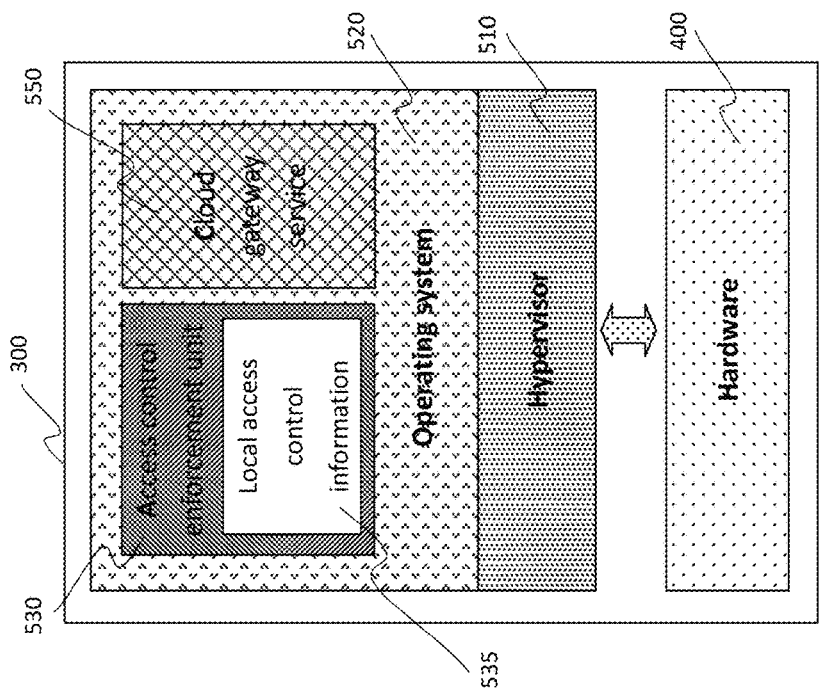
FIG. 4B shows a schematic diagram of the hardware and software architecture of the data server according to one embodiment of the present invention.
Figure 4A:
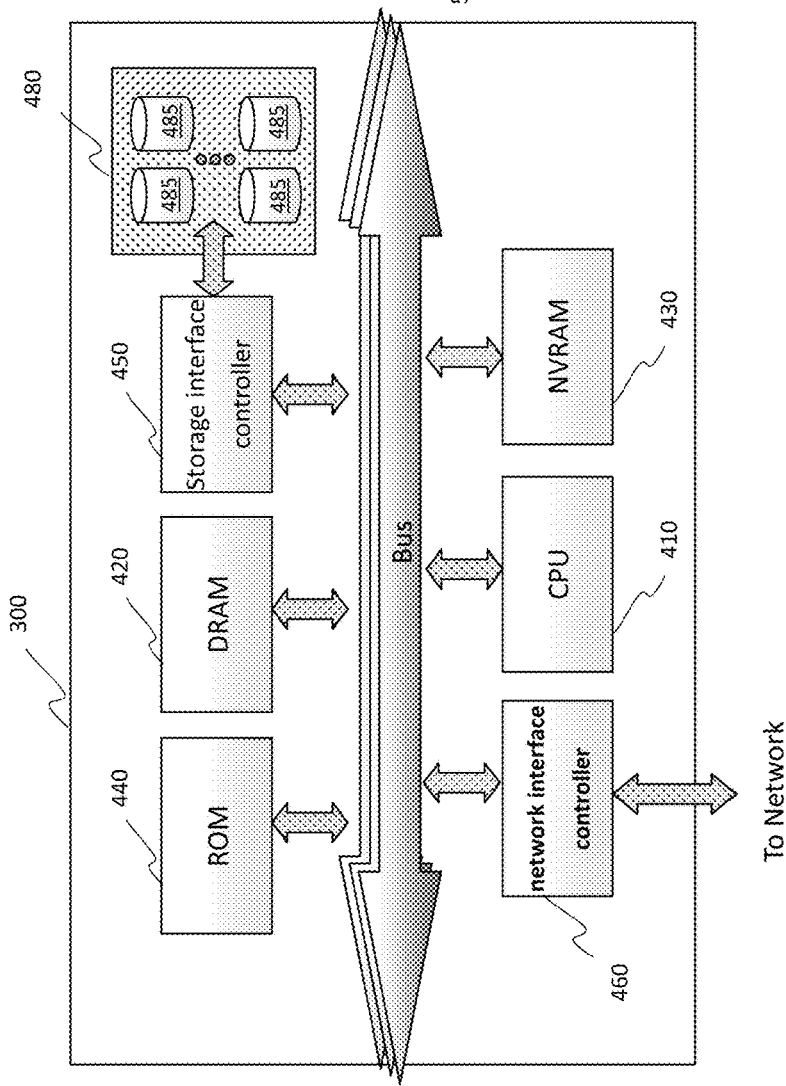
FIG. 4A shows a block diagram of the hardware architecture of the data server according to one embodiment of the present invention.

Please refer to FIG. 4A. FIG. 4A shows a block diagram of basic hardware structure of the data server 300 in FIG. 2 according to one embodiment of the present invention. According to the embodiment of the present invention, the basic structure of the data server 300 includes a central processing unit (CPU) 410, a read only memory (ROM) 440, a dynamic random access memory (DRAM) 420, a storage interface controller 450, a physical storage device array (PSD array) 480, a non-volatile random access memory (NVRAM) 430, and a network interface controller (NIC) 460 and so on, all of which are coupled with one another through one or more bus(es) to communicate information and data therebetween, where the PSD array 480 further includes a plurality of physical storage devices 485, for example, hard disk drives (HDD), solid state disks (SSD) or any other physical storage devices that can achieve the similar storage function.

In FIG. 4A, the CPU 410 is a core unit of the data server 300 and is used to execute data processing procedures among hardware, operating system, and application program. The CPU 410 can be a Power PC, an x86 or any architecture CPU. The ROM 440 is used to store basic input output system (BIOS) and/or other programs used when the data servers 300 is powered on. The DRAM 420 is a temporary storage for storing CPU commands or various data, and is used to store write data from the client computers 500 for being later processed by the CPU 410, or is used to store the data processed by the CPU 410 for being later stored into the PSD array 480 or for sending out the processed data through the network interface controller (NIC) 460. The NVRAM 430 can be implemented by using, for example, a flash memory, which is used to store associated information regarding the execution statuses of I/O requests for further inspecting the I/O requests when power breaks down before the I/O requests are successfully complete. The storage interface controller (SIC) 450 is a storage interface which is used to store data processed by the CPU 410, into the PSD array 480 or to read relevant data from the PSD array 480 in order to temporarily store the relevant data into the DRAM 420 for being later processed by the CPU 410. The communication protocol used by storage interface controller 450 can be, for example, Fibre Channel (FC), Serial attached SCSI (SAS), serial ATA (SATA) or any applicable protocols. The PSD array 480 includes a plurality of physical storage devices 485 to provide storage space to the data servers 300. According to another embodiment of the present invention, when the data servers 300 do not provide storage space for storing data, the PSD array 480 can be omitted. The NIC 460 is coupled to an external network, through which the NIC 460 may transmit the data or information processed by the CPU 410 to any other devices on the network, or through which the NIC 460 may transmit data from other devices on the network to DRAM 420 for temporarily storing.

Please refer to FIG. 4B which shows a schematic diagram of the hardware and software structures of the data server 300 in FIG. 2 according to one embodiment of the present invention. In FIG. 4B, the softwares of the data server 300 are configured on the hardware 400. The architecture of the hardware 400 is shown in FIG. 4A.

According to the embodiment shown in FIG. 4B, there is the hypervisor 510, also called virtual machine monitor (VMM), between the hardware 400 and the operating system (OS) 520 in the data servers 300. The hypervisor 510 (or VMM) can be implemented by software, firmware, or hardware. The hypervisor 510 provides a virtual operating platform for one or more operating system(s) to share the resources of the hardware 400; therefore, the hypervisor 510 can be seen as the "pre operation system" of the operating system 520 in FIG. 4B, which is mainly used to coordinate and distribute the resources of the hardware 400 among multiple operating systems of the data servers 300. In the case without interrupting the operating systems, the hypervisor 510 can automatically increase or decrease the hardware resources utilized by one of the operating systems, for example, the shared CPU resource, memory space, network interface, HDD storage space, and other hardware resources, so as to make workloads among each operating systems nearly balanced. Although in FIG. 4B, there is only one operating system 520, the operating systems performing on the hypervisor 510 can be many. According to another embodiment of the present invention, if the data server 300 needs only one operating system, then the hypervisor 510 can be omitted.

In FIG. 4B, the operating system 520 can be an ordinary operating system, for example, Windows, Linux, Solaris, and so on, and the operating system 520 can provide multi-task, time-sharing environment, so that multiple application programs and procedures can be executed at the same time. In FIG. 4B, there are the application programs of an access control enforcement unit (ACEU) 530 and a cloud gateway service 550 respectively executed on the operating system 520. The access control enforcement unit (ACEU) 530 is a software module which executes I/O requests issued from the client computers 500 as shown in FIG. 2. Whether or not the access control enforcement unit (ACEU) 530 will execute or reject the I/O requests issued from the client computers 500 is determined according to the local access control information 535 stored in the ACEU 530. If the I/O requests issued from the client computers 530 comply with the settings in the local access control information 535, the ACEU 530 will execute the I/O requests from the client computers 500; otherwise, the ACEU 530 will reject the I/O requests from the client computers 500, so as to achieve the purpose regarding data access management on the cloud data 120 by the plurality of data servers 300 in FIG. 2. The cloud gateway service 550 is a media service program between the ACEU 530 and the cloud data 120 as shown in FIG. 2, and accepts commands from the ACEU 530 to access the object files from the cloud data 120.

Figure 1B:
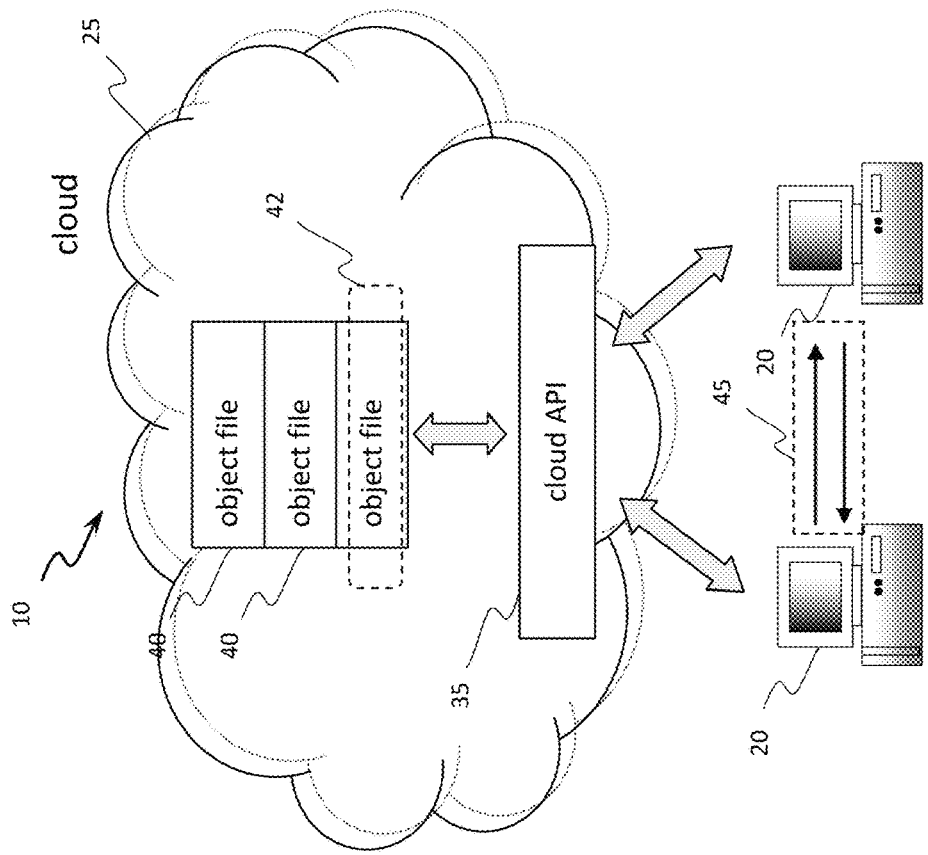
FIG. 1B shows an example of architecture 2 of a cloud data storage system in the prior art.
Figure 1A:
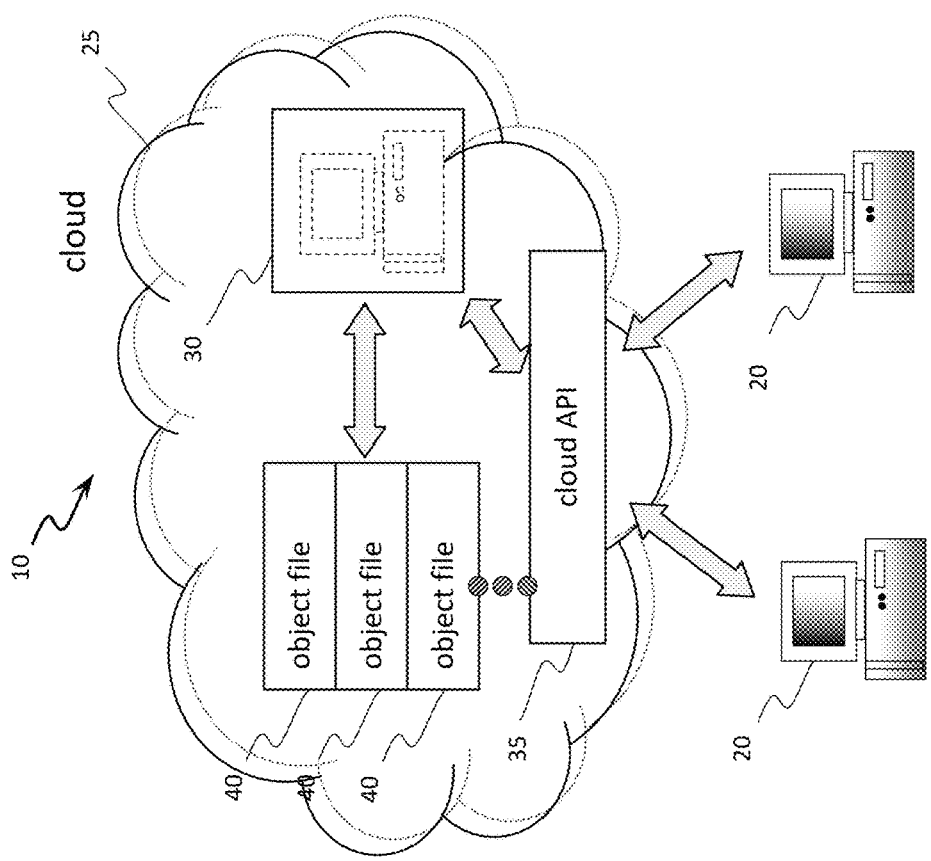
FIG. 1A shows an example of architecture 1 of a cloud data storage system in the prior art.

Again, please refer to FIG. 2. Because the present invention does not use a central management mechanism (CMM), i.e., the virtual machine installed in the cloud storage unit 200, but enables each of the data severs 300 to directly access data from the cloud storage unit 200, when each of the data servers 300 accesses the cloud data 120, the data servers do not need to use the CMM to manage the data access right. According to one embodiment of the present invention, since there is no central data management server (CDMS) installed in the cloud or on the internet, there must be a "data access management mechanism" (DAMM) existed among the data servers 300, so as to avoid the situation that the data servers 300 write data to the same file object in the cloud data 120 at the same time, which would result in a data write error. According to one embodiment of the present invention, the basic concepts of the "data access management mechanism" (DAMM) includes: (1) providing an object file that records the global access control information 92 in the cloud data 120 of the cloud data storage system 100, and the contents of the global access control information 92 record the corresponding relationships of access rights between each of the data servers and its associated folders, as shown in FIG. 5B according to one of the embodiment of the present invention, (2) downloading the object file of the global access control information 92, by the data servers 300 respectively, from the cloud storage unit 200 and updating, according to the downloaded global access control information 92, the local access control information 535, as shown in FIG. 4B, in the data servers 300, and (3) for the I/O requests issued from the client computers 500 to the data servers 300, whether the data servers 300 should execute the I/O requests is determined according to its setting information of the local access control information 535. If the determination is no, the I/O requests are rejected, and if yes, the I/O requests are executed. Through the aforesaid "data access management mechanism" (DAMM) of the present invention, the error situation of writing data into the same user object file 80 at the same time will not happen when the plurality of data servers 300 handle the I/O requests issued from the client computer 500 for accessing data from the cloud storage unit 200. According to one embodiment of the present invention, the aforesaid "data access management mechanism" (DAMM) of the present invention also solves the problems in the prior art as shown in FIG. 1A and FIG. 1B.

Please refer to FIG. 5A and FIG. 5B, according to one embodiment of the present invention, FIG. 5A shows an architecture diagram about the exclusive folders for each of branch offices and their sub-folders under the root directory 555 in the cloud storage unit 200, and FIG. 5B shows a schematic diagram of the global access control information 92 that depicts the architecture of the folders and their sub-folders in FIG. 5A.

According to one embodiment of the present invention, the root directory 555 shown in FIG. 5A includes three folders, i.e., the first folder 560 named "Taipei", the second folder 570 named "New York", and the third folder 580 named "London", all of which are respectively provided for Taipei branch office, New York branch office, and London branch office to store data. Wherein the folder of "Taipei" 560 further includes a multi-layer sub-folders, for example, the sub-folders named "A", "B", "C", "D", "E", "US MKT", "inventory" and so on; the folder of "New York" 570 further includes a multi-layer sub-folders, for example, the sub-folders named "A", "B", "C", "inventory" and so on; the folder of "London" 580 further includes a multi-layer sub-folders, for example, the sub-folders named "A", "B", "C", "inventory" and so on. Suppose that each of the branch offices has an access right of "read and write" (or full control) to the folders belonging to the branch office, but only has an access right of "read only" to other "inventory" sub-folders of other branch offices. For example, the Taipei branch has the access right of "read and write" to the folder of "Taipei" 560 and all its sub-folders and each next layer sub-folders under the folder of "Taipei" 560, but only has the access right of "read only" to the sub-folder of "inventory" 572 under the folder of "New York" 570, and only has the access right of "read only" to the sub-folder of "inventory" 582 under the folder of "London" 580; the New York branch has the access right of "read and write" to the folder of "New York" 570 and all its sub-folders and each next layer sub-folders under the folder of "New York" 570, but only has the access right of "read only" to the sub-folder of "inventory" 562 under the folder of "Taipei" 560, and only has the access right of "read only" to the sub-folder of "inventory" 582 under the folder "London" 580; the London branch has the access right of "read and write" to the folder "London" 580 and all its sub-folders and each next layer sub-folders under the folder of "London" 580, but only has the access right of "read only" to the sub-folder of "inventory" 562 under the folder of "Taipei" 560, and only has the access right of "read only" to the sub-folder of "inventory" 572 under the folder of "New York" 570.

Please refer to the block diagram shown in FIG. 2. Assume that the identity (ID) of the data server A 300 is "Data_Server_A", the identity (ID) of the data server B 300 is "Data_Server_B", and the identity (ID) of the data server C 300 is "Data_Server_C". The Taipei branch uses the data server A 300 to upload data to or download data from the cloud storage unit 200; the New York branch uses the data server B 300 to upload data to or download data from the cloud storage unit 200; the London branch uses the data server C 300 to upload data to or download data from the cloud storage unit 200. Because the present invention does not make data access through a virtual machine installed on the cloud storage unit 200 as the central management mechanism, when one of these branches is going to make data access to the cloud storage unit 200 through different data servers, the data servers must comply with the same mechanism, like the settings of the global access control information 92 shown in FIG. 5B, which is used to standardize the behaviors of different data servers 300 when they are trying to make data access to the cloud data 120, in order to prevent data that belong to some branch office from being read, amended, and deleted by other branch offices.

Please refer to FIG. 5B which shows the content of the global access control information 92 describing the settings of the folders respectively exclusive for each of the branch offices in FIG. 5A. The content of the global access control information 92 can be set up in a "positive listing" manner; in other words, the access right settings for all data servers and the corresponding cloud folders/paths must be recorded in the global access control information 92 as the standard to be followed by the data servers while making data access to the cloud data 120. In the case of the "positive listing", if there is no related settings for some folder recorded in the global access control information 92, that means that there is no related rules which can be followed by the data server 300, and at this time, the I/O requests, issued form the client computers 500, for that some folder, may be rejected by the data server 300. According to another embodiment of the present invention, the content of the global access control information 92 can be set up in a "negative listing" manner. That is, only "unallowable rules" for data servers 300 are recorded in the global access control information 92; in other words, in the case of the "negative listing", if there is no related record in the global access control information 92, that means that there is no access right limit for the data servers 300 to the folders. According to another embodiment of the present invention, the content of the global access control information 92 can adopt both the "positive listing" and the "negative listing" manners at the same time while recording the settings for the access control management. According to one embodiment of the present invention, in FIG. 5B, the content of the global access control information 92 comprises a plurality of entries which can form a table as shown in FIG. 5B or comprises a series of data (not shown) or can be other type of any data recording way, as long as the corresponding relationships of the access rights for the data servers 300 to the associated folders can be clearly recorded and distinguished. Each of the entries at least includes the setting information comprising a data server ID field 590, a folder name field 592, and an access right field 594 and so on.

In FIG. 5B, the data server ID field 590 stands for one of the data servers 300 ID in FIG. 2. Taking FIG. 5A as an example, the data server ID of the data server A 300 is "Data_Server_A", the data server ID of the data server B 300 is "Data_Server_B", and the data server ID of the data server C 300 is "Data_Server_C". The folder name field 592 stands for one of the folders as shown in FIG. 5A, and the folder name has to have a "full path" from the root directory to the pointed folder. For example, when setting up the folder of "Taipei" 560 in FIG. 5A, "\Taipei" is the folder name; when setting up the folder of "US MKT" in FIG. 5A, "\Taipei\A\C\US MKT" is the folder name. The above folder names of "\Taipei" and "\Taipei\A\C\US MKT" respectively express the "full path" from the root directory to the pointed folder. The access right field 594 stands for the access right being set for the data server 300 indicated in the data server ID field 590 to the folder indicated in the folder name field 592. According to one embodiment of the present invention, the access right settings can be any one comprising "Read and Write", "Read Only" and other access right settings, for example, "Modify" and "List". The access right setting of "Read and Write" stands for having both the "Read" and "Write" access rights at the same time, through which, the indicated data server 300 is able to read data from and write data into the indicated folder and its sub-folders. The access right setting of "Read Only" stands for only the "Read" access right, through which, the indicated data server 300 is able to read data from the indicated folder and its sub-folders and is not allowed to write data to the indicated folder and its sub-folders. The access right setting of "Modify" stands for the "Modify" access right, through which, the indicated data server 300 is able to modify the indicated folder and its sub-folders, the permission of which includes reading data from, writing data into, and deleting content of the indicated folder and its sub-folders. The access right setting of "List" stands for the "List" access right, through which, the indicated data server 300 is able to list the content of the indicated folder and its sub-folders. Please be noted that in order to avoid data access conflicts, according to one embodiment of the present invention, only one data server 300, among plural different data servers 300, can have a higher access right to the indicated folder in a period, for example, "Read and Write" and/or "Modify". The rest of the data servers 300 have to be set up with a lower access right, for example "Read only" and/or "List" to the indicated folder in the same period. Moreover, when an access right for an upper folder (parent folder) is set up, then the sub-folders below the parent folder are preset to inherit the same access right as the parent folder. In one embodiment of the present invention, when there is a need that the access right to some sub-folder is different from the access right to its parent folder, the access right to the sub-folder can be further set up with another setting different from its parent folder.

According to the example shown in FIG. 5A, if setting up the data server A 300 that is associated with the Taipei branch, to be able to read and write the files in the folder of "Taipei" 560 and all its sub-folders; in other words, the Taipei branch has the access right of "Read and Write" to the folder "Taipei" 560 and all its sub-folders. Accordingly, in FIG. 5B, the settings about the data server A 300 and the folder of "Taipei" 560 in the global access control information 92 will have one entry recording data on behalf of "Data_Server_A" in the Data Server ID field 590, recording data on behalf of "\Taipei" in the Folder Name field 592, and recording data on behalf of "Read and Write" in the Access Right field 594. Moreover, because the Taipei branch further has the access right of "Read Only" to the folder of "inventory" of the New York branch and to the folder of "inventory" of the London branch, in FIG. 5B, the settings about the data server A 300 and the folder of "New York/Inventory" 572 in the global access control information 92 will have another entry recording data on behalf of "Data_Server_A" in the Data Server ID field 590, recording data on behalf of "\New York\Inventory" in the Folder Name field 592, and recording data on behalf of "Read Only" in the Access Right field 594. For the same reason, the settings about the data server A 300 and the folder "London\Inventory" 582 in the global access control information 92 will have another entry recording data on behalf of "Data_Server_A" in the Data Server ID field 590, recording data on behalf of "\London\Inventory" in the Folder Name field 592, and recording data on behalf of "Read Only" in the Access Right field 594. Likewise, in FIG. 5A, suppose that the New York branch and the London branch upload data to and download data from the cloud storage unit 200 respectively through the data server B 300 and the data server C 300, and respectively make data access to the folder of "New York" 570 and to the folder of "London" 580, then the corresponding settings are shown on some other entries in FIG. 5B, for example, the fourth row for the access right settings to the folder of "New York" 570 and the seventh row for the access right settings to the folder of "London" 580. Again, because the New York branch and the London branch are set up to be able to read ("Read Only") data from the folders of "inventory" of other branches, in FIG. 5B, the fifth row to sixth row and the eighth row to ninth row in FIG. 5B show the entries with the corresponding settings.

FIG. 5B shows that in the global access control information 92, there are three entries associated with "Data_Server_A", which are circled by dotted lines 596, and the entries circled by dotted lines 596 can be deemed as the local access control information 535 stored in the data server A 300. Likewise, in the global access control information 92 of FIG. 5B, there are another three entries associated with "Data_Server_B" and circled by dotted lines 597, and another three entries associated with "Data_Server_C" and circled by dotted lines 598; in other words, the two groups of entries circled by the dotted lines 597 and 598 respectively correspond to the local data access control information 535 stored in the data server B 300 and stored in the data server C 300. The local access control information 535 in each of the data servers 300 only records the access right settings to its associated folders. Therefore, when each of the data servers 300 handles I/O requests from the client computers 500, each of the data servers 300 needs only its local access control information 535 to determine whether or not to execute the I/O requests. Thus, that determination time can be shortened, and the performance of the cloud data storage system 100 can be improved.

Although the global access control information 92 shown in FIG. 5A and the local access control information 535 shown in FIG. 4B are respectively presented in a table, according to another embodiment of the present invention, the global access control information 92 and the local access control information 535 can be recorded in texts, symbols, or some other expression forms. Furthermore, in FIG. 2, the global access control information 92 in the cloud data 120 is not only an object file but also a set of metadata, which is used by the data servers 300 for access management.

In FIG. 5A, each of these three branches, i.e., the Taipei branch, the New York branch and the London branch, has its folders, circled by the dotted lines, with a higher access right (for example, "Read and Write" and/or "Modify"). That is, the three groups of folders circled by the dotted lines are managed by three different branch offices. When there is a need to transfer the higher access right to the sub-folder of "US MKT" 568 under the folder of "Taipei" 560 that belongs to the Taipei branch, to other branch office (for example, the New York branch), it is necessary to execute a "settings change procedure" in order to allow the New York branch to obtain the higher access right (for example, "Read and Write" and/or "Modify") to the sub-folder "US MKT" 568 from the Taipei branch. After the higher access right (for example, "Read and Write") to the sub-folder of "US MKT" 568 is transferred from the Taipei branch to the New York branch, the access right to the sub-folder "US MKT" 568 for the Taipei branch will be downgraded to "Read Only". The result after above access right change is shown in FIG. 6A and FIG. 6B. FIG. 6A shows the folder structure after the authority of the sub-folder of "US MKT" 568 is separately transferred from the Taipei branch, which originally owns the sub-folder, to the New York branch. FIG. 6B shows the contents of the global access control information 92 after the settings change procedure is complete. Compared to FIG. 5B, two new entries are added in FIG. 6B in order to record the access right change and are respectively circled by the bold lines 599A and 599B as shown in FIG. 6B.

Please refer to FIG. 6A and FIG. 6B again. According to FIG. 6A, the higher access right (for example, "Read and Write") to the sub-folder of "US MKT" 568 is transferred from the Taipei branch to the New York branch, and the "data access conflict" should be avoided according to one principle of the present invention, that is, when setting up the data access rights to a folder, only one data server 300, among plural different data servers 300, can have a higher access right, for example, "Read and Write" and/or "Modify" to that folder at the same time or in the same time period, and the rest of the data servers 300 must be set up with a lower access right, for example, "Read Only" to that folder. Therefore, the access right for the Taipei branch to the sub-folder of "US MKT" 568 cannot remain the original "Read and Write", but is amended to "Read Only". Moreover, the access right to the sub-folder of "US MKT 568" is preset to inherit the access right settings of its parent folder of "Taipei" 560; therefore, in the global access control information 92 in FIG. 5B, there is no entry specifically for recording the access right to the sub-folder of "US MKT" 568. However, if the sub-folder does not follow the default setting to inherit the access right of its parent folder, there is a need to add an entry for recording the access right setting for the sub-folder (for example, the sub-folder of "US MKT" 568) into the global access control information 92 as the setting circled by the bold lines 599A shown in FIG. 6B, where the access right for the "Data_Server_A" corresponding to the sub-folder of "US MKT" 568, is set up to "Read Only". On the other hand, the higher access right of the sub-folder of "US MKT" 568 is transferred to the New York branch, and therefore, there is a need to add an entry into the global access control information 92, as the setting circled by the bold lines 599B shown in FIG. 6B, in order to record the access right for "Data_Server_B" corresponding to the sub-folder of "US MKT" 568 being "Read and Write". According to another embodiment of the present invention, the time period for the data server A 300 at the Taipei branch and for the data server B 300 at the New York branch to have the higher access right (for example, "Read and Write" and/or "Modify") to the sub-folder of "US MKT" 568 is different, non-overlapping, mutually exclusive, or separate. For example, it is set up that the data server A 300 of the Taipei branch has the higher access right (Read and Write) to the sub-folder of "US MKT" 568 in the period from Taipei time 8:00 to 20:00 every day, while the data server B 300 of the New York branch has the higher access right (Read and Write) to the sub-folder of "US MKT" 568 from Taipei time 20:00 to 8:00 every day. For a specific folder (for example, "US MKT" 568), through a scheduling method, the higher access right (for example, "Read and Write" and/or "Modify") can be assigned to different data servers 300 in different time periods, so that the plurality of data servers 300 may take turn to have the higher access right to the specific folder in different time periods. However, such a scheduling method for setting up the access right also must comply with the aforesaid principle, i.e., in order to avoid data access conflict, when setting up the data access right to a folder, only one data server 300, among plural different data servers 300, is allowed to have the higher access right (for example, "Read and Write" and/or "Modify") to the folder during the same time period, and the rest of the data servers 300 must be set up with the lower access right, for example "Read Only". Therefore, from the above-mentioned example, the data server A 300 (at the Taipei branch) and the data server B 300 (at the New York branch) are limited to have the higher access right ("Read and Write") to the sub-folder of "US MKT" 568 in different time periods that are not overlapped with each other. Except the time period with the higher access right, the access right for the data server A 300 or the data server B 300 corresponding to the folder "US MKT" 568, is only "Read Only".

Please refer to FIG. 6C. FIG. 6C shows the content of the local access control information 535 in each of the data servers 300. FIG. 6C includes the local access control information 535A in the data server A 300, the local access control information 535B in the data server B 300, and the local access control information 535C in the data server C 300. In FIG. 6C, the content of these three sets of the local access control information 535A, 535B, and 535C can be found from the content of the global access control information 92 in FIG. 6B. The only difference between them is that the local access control information 535A, 535B, and 535C only record the access right settings related to one of the data servers 300 itself, while the global access control information 92 includes the settings of all the local access control information 535 associated with three different data server 300. In the local access control information 535A, the Data Server ID field 590 only records data on behalf of "Data_Server_A"; in the local access control information 535B, the Data Server ID field 590 only records data on behalf of "Data_Server_B"; in the local access control information 535C, the Data Server ID field 590 only records data on behalf of "Data_Server_C". Because "Data_Server_A", "Data_Server_B", and "Data_Server_C" in the Data Server ID field 590 respectively correspond to the data server A 300, the data server B 300, and the data server C 300, the table 535A, the table 535B, and the table 535C are accordingly to be known as the local access control information 535 in the data server A 300, in the data server B 300, and in the data server C 300. Since in FIG. 6B, the content of the global access control information 92 includes the content of each the local access control information 535, according to another embodiment of the present invention, the data servers 300 may use the global access control information 92 as the local access control information 535 in each of the data servers 300, and no need to go through data filtering.

Figure 7:
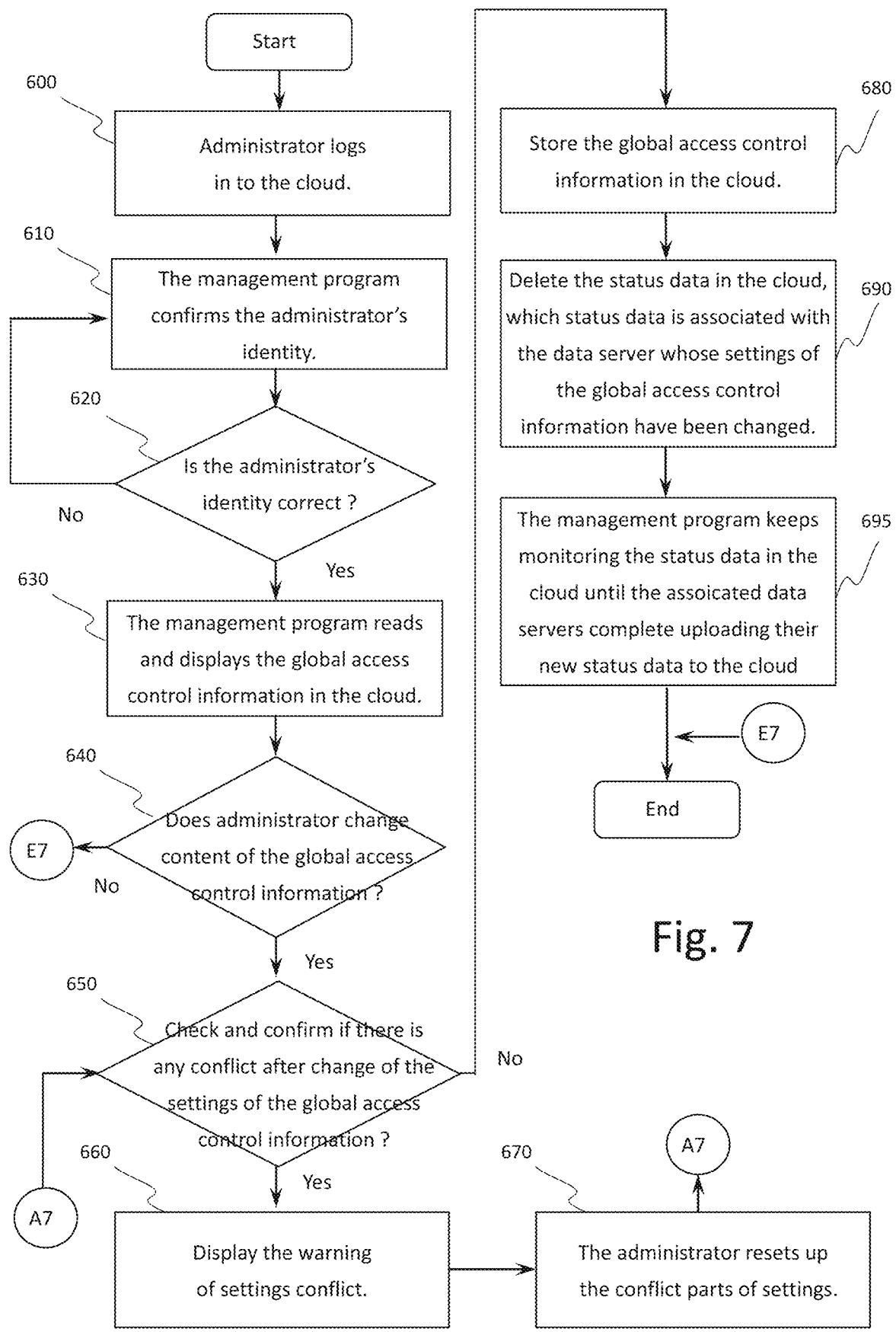
FIG. 7 shows a flowchart for changing the settings of the global access control information according one embodiment of the present invention.

According to one embodiment of the present invention, the content of the global access control information 92 in the cloud data 120 as shown in FIG. 2 has to be changed by the administrator. The administrator may change the global access control information 92 in the cloud data 120 through any one of the data server A 300, the data server B 300, and the data server C 300. According to another embodiment of the present invention, in addition to the data servers 300, the administrator may change the settings of the global access control information 92 through other computers. FIG. 7 shows the flowchart of how the administrator changes the settings of the global access control information 92.

Please refer to FIG. 7 which is one embodiment of the present invention. FIG. 7 shows the flowchart of how the administrator changes the settings of the global access control information 92, where the procedure begins with step 600.

In step 600, the administrator logs in to the cloud. Because the administrator may change the global access control information 92 in the cloud data 120 through any one of the data servers 300, a management program (not shown) in that chosen data server 300 is executed by the administrator to change the settings of the global access control information 92 in the cloud data 120, and the management program is designed to change the content of the global access control information 92 through a user interface (UI).

In step 610, the management program confirms the administrator's identity. This step is taken to avoid improper changes made by other people except the administrator. After the management program is executed, according to one embodiment of the present invention, the management program will automatically download the password from the cloud storage unit 200, and the administrator has to input the correct administrator's password in order to subsequently handle the settings of the global access control information 92; otherwise, it is not allowed to enter into the global access control information 92 for any further amendments and changes. According to another embodiment of the present invention, the administrator has to input both correct the administrator's name and the password at the same time so that the settings of the global access control information 92 can be changed.

In step 620, the management program determines, through correctness of the password, whether the administrator's identity is correct or not. If yes, then step 630 is performed. If no, then the process flow goes back to step 610, and continues asking to input the administrator's password to make sure the administrator's identity. According to one embodiment of the present invention, in the case where the administrator keeps inputting incorrect password, the administrator's serial incorrect password will not influence the administrator's keeping logging. According to another embodiment of the present invention, when the administrator continues inputting incorrect password three times, the management program will automatically terminate the logging procedure of the global access control information 92.

In step 630, the data server 300 reads and displays the content of the global access control information 92 in the cloud through the management program. Through the user interface of the management program, the content of the global access control information 92 are shown on the user interface. In one embodiment of the present invention, the setting screen of the global access control information 92 can be the tables as shown in FIG. 5B and in FIG. 6B. According to another embodiment of the present invention, the setting screen of the global access control information can be shown in a text or symbol manner. When the content of the global access control information 92 are shown on the user interface, the administrator can change any one of fields or add any new settings.

In step 640, the management program determines if the content of the global access control information 92 are changed. If no, the process flow terminates the setting procedure of the global access control information 92. If yes, the process flow continues to execute the determination in step 650.

In step 650, the management program checks and confirms if there is any conflict after the settings of the global access control information 92 are changed. According to aforesaid principle of the present invention, i.e., in order to avoid the data access conflict, when setting up the access right for the same folder to different data servers 300, only one of the data servers 300 can have the higher access right (for example, "Read and Write" and/or "Modify") for the folder during the same time period, and the rest of the data servers 300 must be set up to having the lower access rights for the folder, for example "Read Only" and/or "List". When different data servers 300 that, during the same time period, have the access rights "Read and Write" for the same folder, are going to access the same folder, the conflict will happen. Such a conflict is not allowed when the settings of the global access control information 92 are changed by the management program. If the management program confirms that there exists such a conflict after the settings of the global access control information 92 are changed, then the process flow goes to step 660, and if no, goes to step 680.

In step 660, the management program displays a setting warning for such a conflict. When the management program confirms that there exists such a conflict regarding the settings of the global access control information 92, the management program will display the setting warning for the conflict in order to remind the administrator of the conflict that happens in the current settings.

In step 670, the administrator re-sets up the conflict part of the settings of the global access control information 92. When the management program displays that there exists the conflict in the settings, the management program will make a cursor stay on that mistaken entry, and the administrator has to amend that mistaken entry. After execution of step 670, the management program will go back to step 650 to check again and to determine until all conflicts in the settings do not exist anymore.

In step 680, the management program stores the updated global access control information 92 into the cloud. After the administrator surely changes the settings of the global access control information 92 through the user interface, the management program will store, through the data server 300 that is logged in, the updated settings of the global access control information 92 into the cloud in an overwriting manner, and at the same time, generate a log file for setting, and store the log file for setting, into the cloud. The log file for setting can show all change history made to the global access control information 92, including amending date/time, the data servers' 300 identities, folder names whose access rights are changed, the change of the amended access rights and so on.

In step 690, the management program deletes the related sets of status data, which are associated with the data servers 300 that are affected by the change of the settings of the global access control information 92, from the cloud. When a corresponding relationship about an access right of some data server 300 to some folder is generated, in the cloud there will be a set of status data which record such a corresponding relationship, for example, 94A, 94B and 94C in FIG. 2. Because there could be many folders that are associated with one data server 300, there could be many sets of status data for recording these corresponding relationships. Once in the cloud, one or more sets of status data disappear, that means that the access right for the data server 300 to the folder, that is associated with the set of status data, is changed; therefore, the data server 300 has to download the latest global access control information 92 from the cloud, update its local access control information 535 through the latest global access control information 92, and then handle I/O requests from the client computers 500 according to the updated access right. When one or more sets of status data in the cloud for recording the corresponding relationship(s) about access right for some data server 300 to one or more folders disappear, that data server 300 will be triggered to update its local access control information 535. When that data server 300 completes updating of its local access control information 535, that data server 300 will upload a new set of status data for recording the new corresponding relationship, into the cloud. According to another embodiment of the present invention, the corresponding relationships about access rights of the data server 300 to multiple associated folders are recorded in the same set of status data. Once one of the access rights of the data server 300 to some associated folder is changed, the whole set of status data of that data server 300 in the cloud will be deleted and the data access for all associated folders for the data server 300 will be influenced. The disappearance of the status data will trigger the data server 300 to execute the change procedure to update its local access control information 535. Then the data server 300 will upload a new set of status data for recording the new corresponding relationship to the cloud.

In step 695, the management program keeps monitoring the situation regarding the status data in the cloud until associated data servers 300 complete uploading their new sets of status data to the cloud. Regarding the administrator's execution of changing the settings of access right for some folder in the global access control information 92, the management program has to keep monitoring if the data server 300 that is affected due to the change of the access right for the folder, has uploaded its new set of status data to the cloud until all affected data servers 300 have uploaded their new sets of status data for the associated folders to the cloud. After completion of step 695, the procedure of administrator's changing the content of the global access control information 92 is ended.

Figure 8:
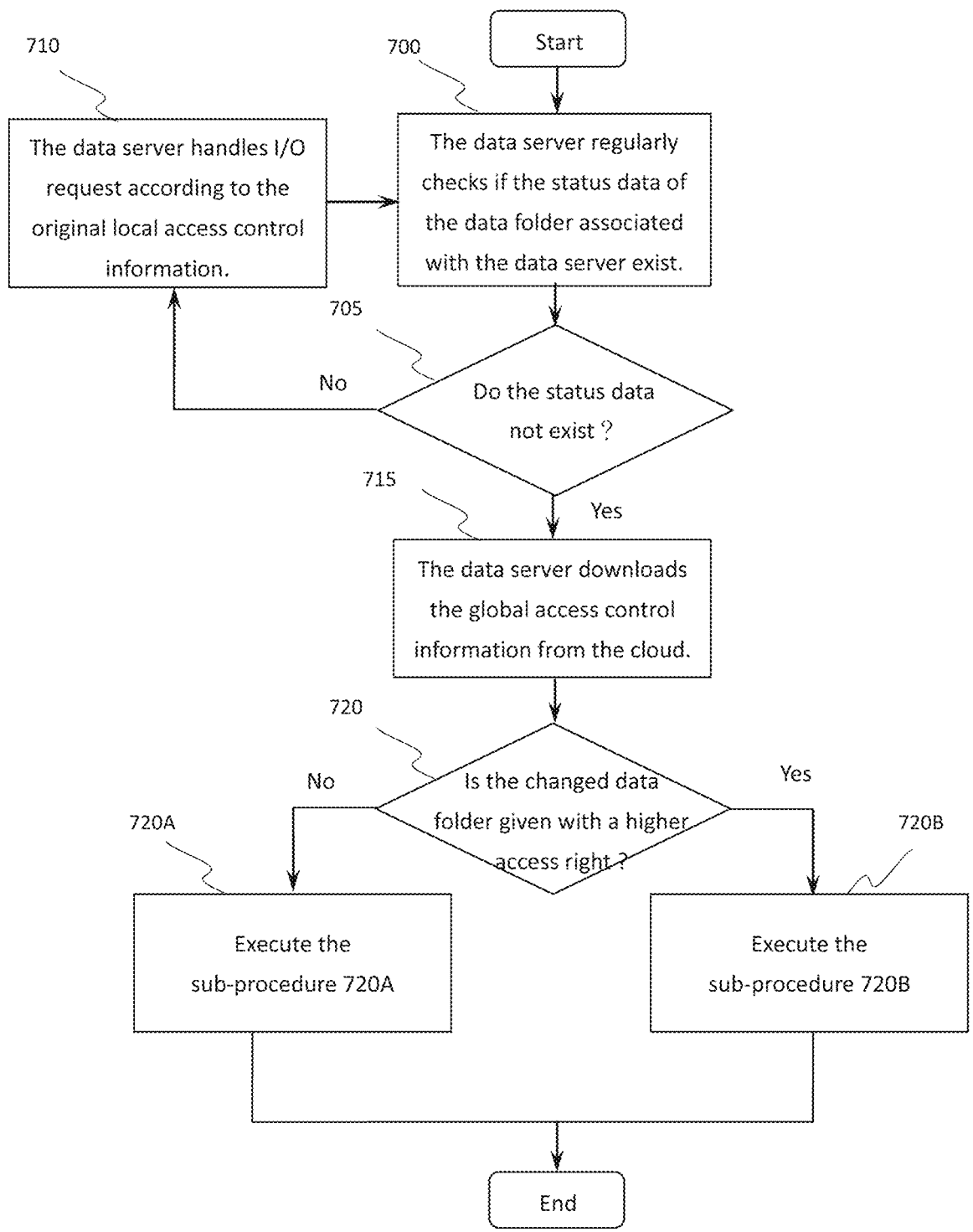
FIG. 8 shows a flowchart of the handling procedure executed by one of the data servers after settings of the global access control information are changed according one embodiment of the present invention.
Figure 8A:
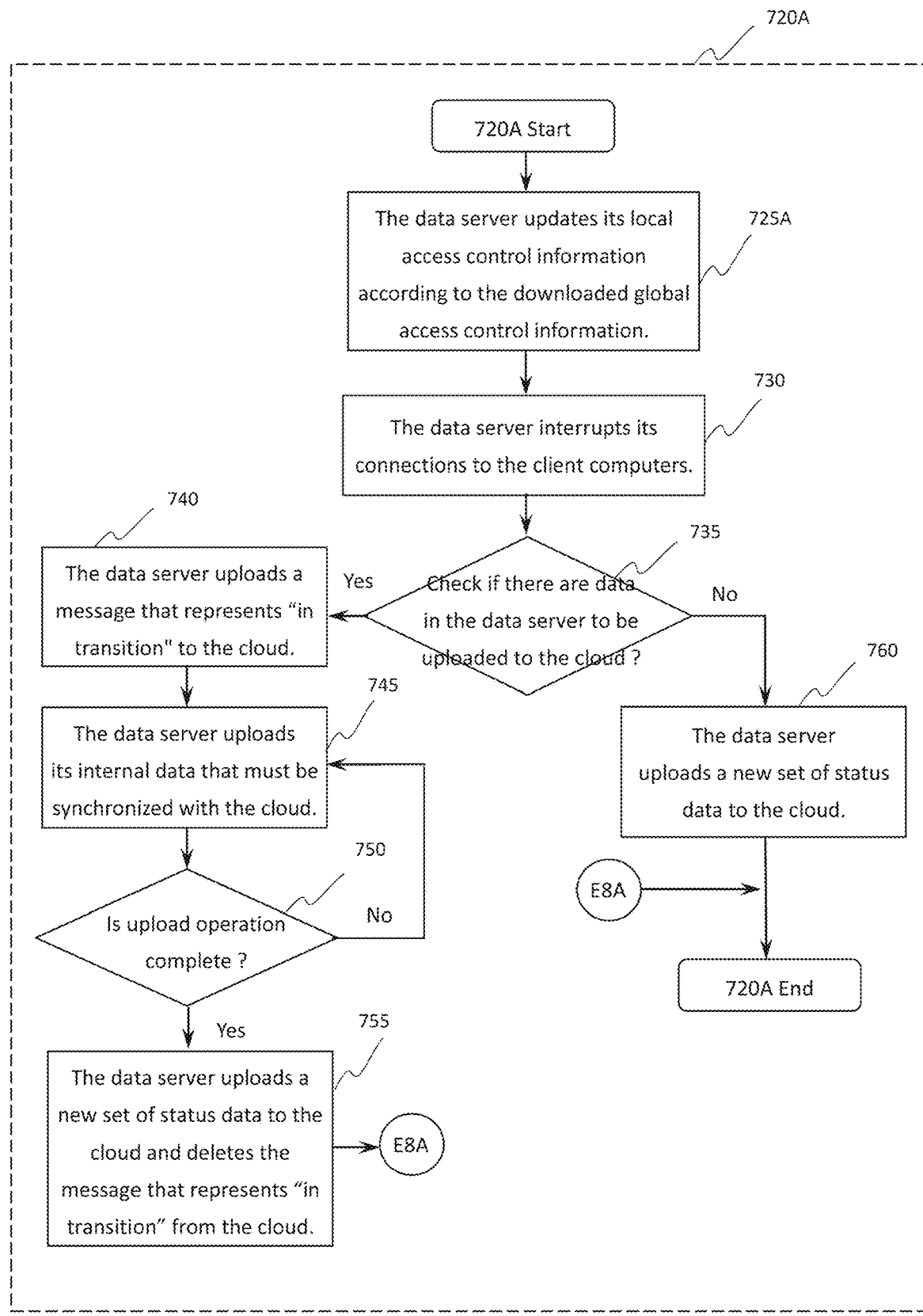
FIG. 8A shows a flowchart of the sub-procedure in step 720A in FIG. 8.
Figure 8B:
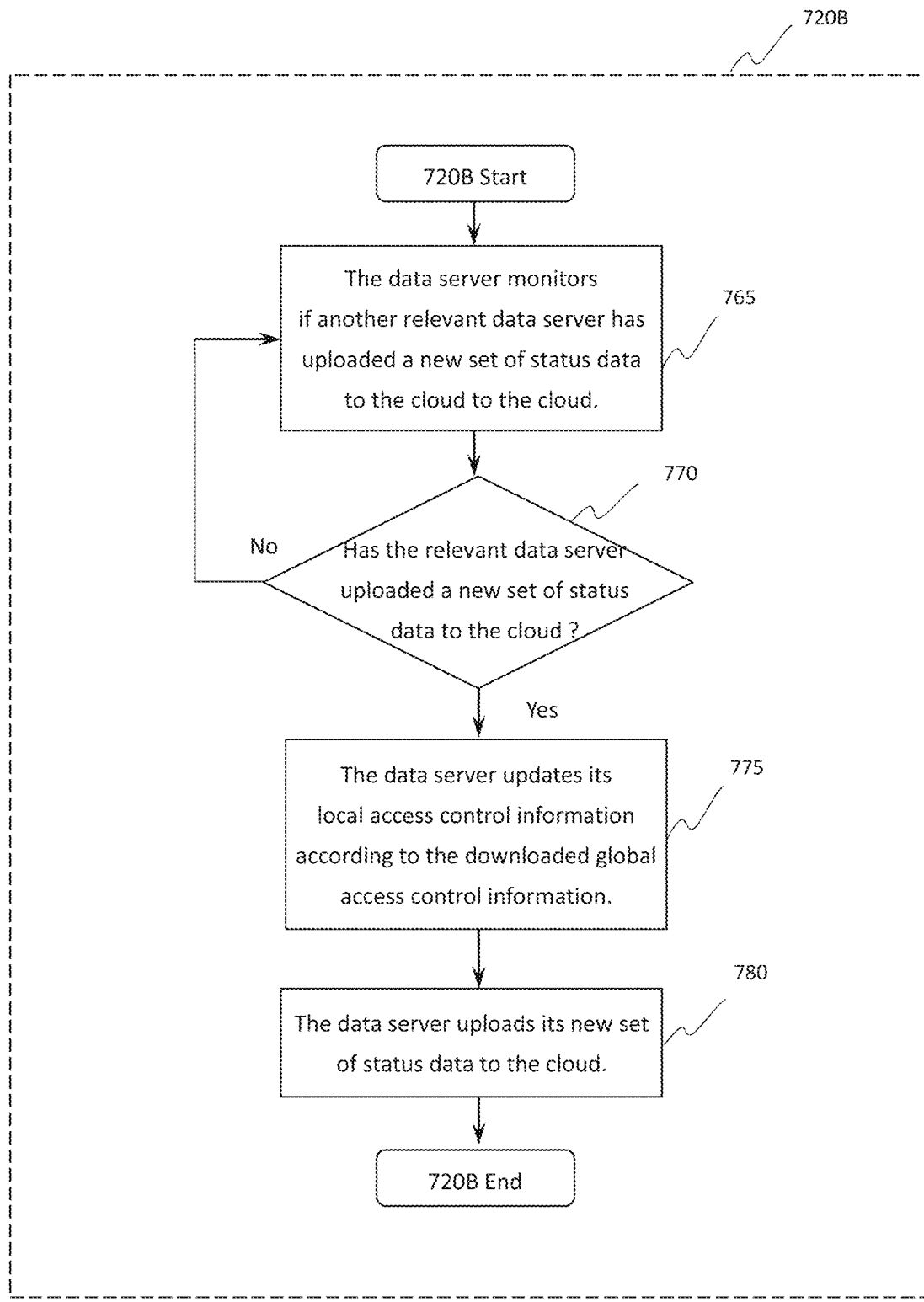
FIG. 8B shows a flowchart of the sub-procedure in step 720B in FIG. 8.

Please refer to FIG. 8, FIG. 8A and FIG. 8B. According to one embodiment of the present invention, FIG. 8, FIG. 8A and FIG. 8B collectively show a handling procedure performed by each of the data servers 300 due to the administrator's change on the settings of the global access control information 92. The handling procedure can be executed by any one of the data servers 300 in FIG. 2, as long as that data server 300 detects that the settings of associated folders in the cloud data system 100 are changed. The handling procedure shown in FIG. 8, FIG. 8A and FIG. 8B is not only limited to a specific data server 300 that was used to change the settings of the global access control information 92 by the administrator. FIG. 8, FIG. 8A and FIG. 8B illustrate the handling procedure for only one of the folders in the global access control information 92, when the settings of the access right for the one folder is changed. When the access right for some folder is changed, each of the data servers 300 that are associated with such a change of the folder must execute the handling procedure shown in FIG. 8, FIG. 8A and FIG. 8B. The handling procedure begins with step 700.

In step 700, each of the data servers 300 regularly checks if in the cloud, all sets of status data that are associated with themselves still exist, where "the sets of status data which are associated with themselves" refer to the sets of status data which record the corresponding relationships about access rights for one of data servers 300 to one or more folders. According to one embodiment of the present invention, each of the data servers 300 will regularly checks at a fixed time interval (for example, one time per 10 seconds) if in the cloud, all sets of status data which are associated with themselves still exist. According to another embodiment of the present invention, the timing for the data servers 300 to check their related sets of status data is not limited to a fixed time interval, but can be any variable time interval (for example, the duration with any time interval). Because the administrator may change the settings of the global access control information 92 through the aforesaid management program, when the access right for one of folders is changed, the management program will delete the associated sets of status data in the cloud. For example, if the settings of the global access control information 92 is changed in order to transfer the higher access right (for example, "Read and Write") of one folder from the data server A 300 to the data server B 300, then in one embodiment of the present invention, the management program will delete the related sets of status data that record the corresponding relationships of "the data server B 300 to the folder" and "the data server A 300 to the folder". Since in the global access control information 92, the corresponding relationships of access rights between the data servers 300 and the related folders could be many, in the cloud there could have many sets of status data that are associated with the data servers 300. In the embodiment of the present invention, only one of the folders, the settings of which are changed, is taken into account as an example to illustrate the handling procedure performed by each of the data servers 300 associated with the one folder. In step 700, the data server 300 has to regularly check if all sets of status data that are associated with the data server 300 still exist in order to determine whether there is any change on the settings of the access rights for the folders that are associated with the data server 300.

In step 705, the data server 300 determines if in the cloud, any of the sets of status data that are associated with the data server 300 does not exist. If no, that means that all sets of status data that are associated with the data server 300 still exist, and then step 710 is executed. If yes, that means that at least one set of status data that are associated with the data server 300 does not exist, and then step 715 is executed.

In step 710, the data server 300 handles, according to its original local access control information 535, I/O requests from the client computers 500 in a normal manner. When the data server 300 determines that all the associated sets of status data still exist in the cloud, it means that the access rights for the folders that are associated with the data server 300 are not changed. Therefore, in step 710, the data server 300 will handle the I/O requests issued from the client computers 500 in a normal manner according to its original local access control information 535. Please refer to FIG. 5B. If one of the client computers 500 is going to access the data in the cloud through the data server B 300, and if the I/O request issued from the client computer 500 is "to read the file of list_all.dat in the sub-folder naming inventory under the folder naming Taipei", because in FIG. 5B, the fifth row's content shows that the access right for the data server B to the "\Taipei\Inventory" sub-folder is "Read Only", the I/O request "to read the file of list_all.dat in the "inventory" sub-file folder under the "Taipei" folder" from the client computer 500 entirely complies with the management rules shown in the fifth row of FIG. 5B, and then the data server B 300 will execute the I/O request "to read the list_all.dat in the "inventory" sub-folder under the "Taipei" folder", and send a reply regarding the data of "\Taipei\Inventory\list_all.dat", to the client computer 500. However, if the I/O request from the client computer 500 does not comply with the management rules shown in the settings of the local access control information 535 in the data server B 300, then the data server B 300 will reject that I/O request issued from the client computer 500. Because the data server B 300 determines that all sets of status data corresponding to the folders that are associated with the data server B 300 still exist, in step 710 the data server 300 will handle the I/O requests issued from the client computer 500 in a normal manner according to its original local access control information 535. Soon after this, the process flow skips back to step 700.

In step 715, the data server 300 downloads the global access control information 92 from the cloud into the data server 300. When the data server 300 detects that any associated sets of status data in the cloud does not exist, it means that the administrator has changed the settings of the global access control information 92 about the access right for the associated folder for the data server 300; in other words, at that time point, for the data server 300, the local access control information 535 in the data server 300 is not consistent with the global access control information 92 in the cloud about the access right settings for the data server 300; therefore, that data server 300 has to download the latest global access control information 92 from the cloud in order to update its local access control information 535 for handling I/O requests issued from the client computers 500 according to the updated local access control information 535.

In step 720, the data server 300 determines if in the latest global access control information 92, the folder which is associated with the data server 300, and the settings of which has been changed, is given with a higher access right. If the determination is made no, the sub-procedure 720A that corresponds to the step 720A is executed. If the determination is made yes, then the sub-procedure 720B that corresponds to the step 720B is executed. Sub-procedure 720A is shown in FIG. 8A, while sub-procedure 720B is shown in FIG. 8B.

According to one embodiment of the present invention, assume that the data server 300 has only two sorts of access rights, i.e., "Read Only" and "Read and Write", to a folder. Accordingly, in step 720 the so-called "the folder with setting change is given with a higher access right" refers to the fact that after the data server 300 compares the global access control information 92 downloaded in step 715 with the local access control information 535 therein, the data server 300 finds that the access right for itself to a folder is changed from "Read Only" to "Read and Write". According to one embodiment of the present invention, as long as the access right for a data server 300 to a folder is changed from "Read Only" up to "Read and Write", there must be another data server 300 whose access right to the folder is changed from "Read and Write" down to "Read Only". In this situation, the data server 300 that is to be given with the higher access right, has to wait for another data server's 300 completion of procedure of releasing the higher access right, which is to be given with the lower access right. Upon completion of releasing the higher access right by the data server 300 with access right reduction, the data server 300 that is to be given with the higher access right, can start to execute the handling procedure for changing the access right for the folder in order to obtain the higher access right. In contrast, the data server 300 that is to be given with the lower access right, does not need to wait for the other data server's 300 completion of releasing the access right, but can directly execute its handling procedure for changing the access right for the folder, and then handles I/O requests issued from the client computer 500 according to the latest lower access right.

Please refer to FIG. 8A. According to one embodiment of the present invention, FIG. 8A shows the sub-procedure of step 720A in FIG. 8. In FIG. 8, when in step 720, the determination of step 720, i.e., "if the folder with changed settings is to be given with a higher access right", is made no, the process flow goes to step 720A in order to execute the sub-procedure of FIG. 8A. The sub-procedure in FIG. 8A begins with step 725A.

In step 725A, step 725A shows that the data server 300 updates its local access control information 535 according to its downloaded global access control information 92. When the process flow goes to step 725A, it means that in the settings of the latest global access control information 92, the access right for the data server 300 to some folder which is associated with the data server 300, is changed to a lower access right, for example, from "Read and Write" down to "Read Only". Because of being changed to a lower access right, in one embodiment of the present invention, the data server 300 does not need to wait for another data server's 300 completion of releasing its higher access right, but can directly execute the handling procedure for changing the access right for itself to the folder. According to another embodiment of the present invention, because the local access control information 535 of the data server 300 is just a part of the global access control information 92, after the latest global access control information 92 is downloaded, the data server 300 can just use the global access control information 92 as the local access control information 535 in the data server 300, and there is no need to further filter out the settings regarding the data server 300.

In step 730, it shows that the data server 300 interrupts its connections to the client computers 500. It is the situation that the access right for the data server 300 to some folder is changed to a lower access right, for example, from "Read and Write" down to "Read Only". According to one embodiment of the present invention, as long as the access right for a data server 300 to some folder is changed to the lower access right, the data server 300 will interrupt its connections to all client computers 500. According to another embodiment of the present invention, for some client computers 500 connected to the data server 300, if their I/O requests do not relate to the folder whose access right has been changed, then the data server 300 does not have to interrupt its connections to these unaffected client computers 500.

Again, if the access right for a data server 300 to a folder is changed to the lower access right, it means that the access right for the data server 300 to the folder is originally a higher access right, for example "Read and Write". During the change phase of the access right, the data server 300 might be writing write data into one or some files in the folder for its client computers 500, or maybe has temporarily stored the write data to be written. Because these temporarily stored data have not been transmitted to the cloud for storing, these temporarily stored data can be regarded as cache data, and the data server 300 has to upload the cache data to the cloud for storing.

In step 735, the data server 300 checks and determines if, in the data server 300, there are any cache data to be uploaded to the cloud. If yes, then step 740 is executed. If no, then step 760 is executed. As the above-mentioned, because the access right for the data server 300 to the folder is changed to the lower access right, during the change phase of the access right, there might exist the write data, i.e., the cache data, in the data server 300, to be transmitted to the cloud for storing. The data server 300 has to determine if, in the data server 300, there are the cache data to be transmitted to the cloud for storing.

In step 740, the data server 300 uploads an "in transition" message to the cloud, the step of which is to make the other data servers 300 that must wait for the data server's 300 completion of its access right change procedure, understand the current access right change status of the data server 300. Taking into consideration that the data amount of the cache data to be uploaded into the cloud might be large, and thus, uploading the cache data to the cloud might take much time, in order to prevent the rest of the data servers 300 from mistakenly determining that the data server 300 is brokendown during that upload time, before the data server 300 uploads its cache data, the data server 300 may first transmit the "in transition" message to the cloud so as to make the rest of the data servers 300 understand the current status of the data server 300.

In step 745, the data server 300 uploads its cache data that have to be synchronized with the cloud, to the cloud. As above-mentioned, the data amount of the cache data might be large; therefore, how much time the cache data require to be uploaded to the cloud for storing mostly depends on the data amount of the cache data.

In step 750, the data server 300 determines if the operation regarding uploading the cache data to the cloud is complete. If the determination is made yes, then step 755 is executed, and if the determination is made no, the process flow goes back to step 745 to continue executing the operation regarding the data server's 300 uploading its cache data which have to be synchronized with the cloud, into the cloud for storing.

In step 755, the data server 300 uploads a new set of status data to the cloud and, deletes the "in transition" message in the cloud, which represents that the data server 300 is transmitting the cache data, where the new set of status data represents a new access right for the data server 300 to the associated folder. According to one embodiment of the present invention, after the data server 300 completes its uploading the cache data, the data server 300 deletes the "in transition" message from the cloud so as to inform the rest of the data servers 300 of its completion of uploading the cache data. Moreover, because at that time, the data server 300 has completed updating its local access control information 535, the data server 300 will upload a new set of status data to the cloud, the action of which represents that the local access information 535 of the data server 300 has synchronized with the global access control information 92 in the cloud. After completion of execution of step 755, the sub-procedure of step 720A is ended.

Please look back to aforesaid step 735 in the process flow. In step 735, when the determination is made "no", step 760 will be executed.

In step 760, the data server 300 uploads a new set of status data to the cloud. The new set of status data represents that the data server 300 has completed an "access right change procedure" for the associated folder. When the process flow goes to step 760, it means that the data server 300 does not have any cache data needed to be synchronized with the cloud, and the data server 300 has completed updating its local access control information 535 therein. Therefore, the data server 300 has to upload the new set of status data to the cloud in order to show that the local access control information 535 of the data server 300 has synchronized with the global access control information 92 in the cloud. After completion of executing step 760, the sub-procedure 720A is ended.

Please refer to FIG. 8B. According to one embodiment of the present invention, FIG. 8A shows the flowchart of the sub-procedure of step 720B in FIG. 8. When in FIG. 8, the determination of step 720, i.e., if the folder with changed settings is to be given with a higher access right", is made yes, the process flow goes to step 720B in order to execute the sub-procedure of FIG. 8B. The sub-procedure in FIG. 8B begins with step 765.

In step 720 of aforesaid FIG. 8, when the determination is made yes, it means that the data server 300 determines that the associated folder is given with a higher access right, for example, the access right to the folder is changed from "Read Only" up to "Read and Write", and then step 765 is executed.

In step 765, the data server 300 monitors if another relevant data server 300 has uploaded a new set of status data to the cloud, where "another relevant data server 300" refer to another data server 300 whose access right to the associated folder has been changed. In step 765, it specifically refers to "the data server 300 whose higher access right to the associated folder should be released". As the abovementioned, when the data server 300 to a specific folder is going to be given with a higher access right, for example, from "Read Only" up to "Read and Write", the data server 300 has to wait for the release of the higher access right from another data server 300, and then the data server 300 executes the access right change procedure for the specific folder, and then handles I/O requests issued from the client computers 500 to access the specific folder according to the higher access right, where the way of releasing the access right by the relevant data server 300 is done by completing the access right change procedure for the specific folder and uploading a new set of status data to the cloud. Therefore, in step 765, the data server 300 has to monitor if another relevant data server 300 whose access right to the folder is changed, has uploaded a new set of status data that is associated with the folder, to the cloud so as to make sure whether the relevant data server 300 has completed the access right change procedure for the folder or not.

In step 770, the data server 300 determines if another relevant data server 300 has uploaded a new set of status data which is associated with the folder, to the cloud. If no, then the process flow will go back to step 765 for keeping waiting for. If yes, then step 775 will be executed. As described in step 765, the data server 300 checks through the cloud if the other data servers 300 has uploaded a new set of status data to the cloud so as to ensure the completion of the access right change procedure for the folder.

In step 775, the data server 300 updates it local access control information 535 according to the downloaded global access control information 92. Because in this situation, the access right for the data server 300 to the associated folder is given with a higher access right, for example, from "Read Only" up to "Read and Write", and the relevant data server 300 has completed the access right change procedure for the associated folder, the data server 300 will begin to execute its access right change procedure for the associated folder. In step 775, the data server 300 updates its local access control information 535 according to the global access control information 92 downloaded in step 715. According to one embodiment of the present invention, since the settings of the local access control information 535 is just a part of the global access control information 92, after downloading the latest global access control information 92, the data server 300 can just use the global access control information 92 as the local access control information 535, and there is no need to further filter out the part of settings regarding the data server 300.

In step 780, the data server 300 uploads a new set of status data to the cloud, where the new set of status data represents that the data server 300 has completed the access right change procedure for the specific folder. Because the data server 300 may only have a "Read Only" access right to the associated folder before the global access control information 92 is updated, the data server 300 should not have any cache data needed to be transmitted to the cloud for the associated folder. Therefore, under such a situation, the data server 300 does not need to transmit any cache data to the cloud. Moreover at this moment, the data server 300 has completed updating its local access control information 535, so the data server 300 has to upload a new set of status data that is associated with the associated folder, into the cloud in order to represent that the local access control information 535 therein has been synchronized with the global access control information 92 in the cloud. After executing step 780, the sub-procedure of step 720B is ended. At the time of going into this step, the data server 300 has completed its access right change procedure for the associated folder.

In the sub-procedures of the aforesaid step 720A and step 720B, once the local access control information 535 of the data server 300 is updated, in any steps (at any time points) the data server 300 can accept connections from the client computers 500, no matter whether connections from the data server 300 to the client computers 500 were disconnected or not. The data server 300 handles I/O requests issued from the client computers 500 according to the updated local access control information 535.

Please refer to FIG. 9, FIG. 9A, FIG. 9B and FIG. 9C. According to another embodiment of the present invention, FIG. 9, FIG. 9A, FIG. 9B and FIG. 9C collectively show another handling procedure, executed by one of the data servers 300, in response to the administrator's changes on the settings of the global access control information 92. Compared to aforesaid FIG. 8, FIG. 8A, and FIG. 8B, FIG. 9 and FIG. 9A correspond to FIG. 8, and FIG. 9B corresponds to FIG. 8A, and FIG. 9C corresponds to FIG. 8B. There are many similarities between the first embodiment presented by FIG. 8, FIG. 8A and FIG. 8B and the second embodiment presented by FIG. 9, FIG. 9A, FIG. 9B, and FIG. 9C, but the main difference between the first embodiment and the second embodiment is that there can be "one or more folders" being changed with the settings of access rights in the global access control information 92 at the same time. The second embodiment presented by FIG. 9, FIG. 9A, FIG. 9B and FIG. 9C can be performed by any of the data servers 300 in FIG. 2, as long as that data server 300 detects that, in the cloud data storage system 100, the settings of the associated folders for that data server 300 are changed.

Figure 9:
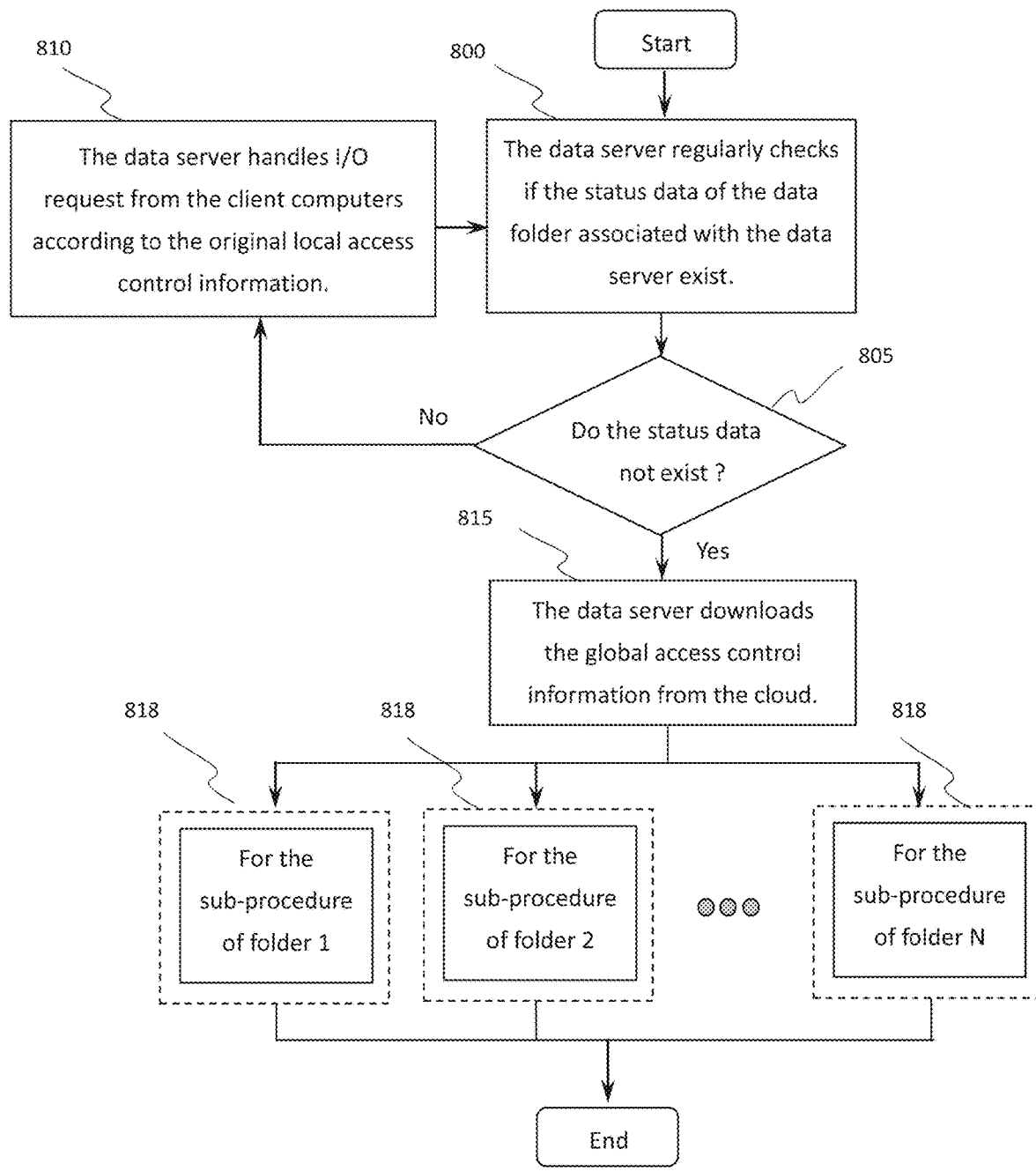
FIG. 9 shows a flowchart of the handling procedure executed by one of the data servers after the settings of the global access control information are changed according to another embodiment of the present invention.
Figure 9A:
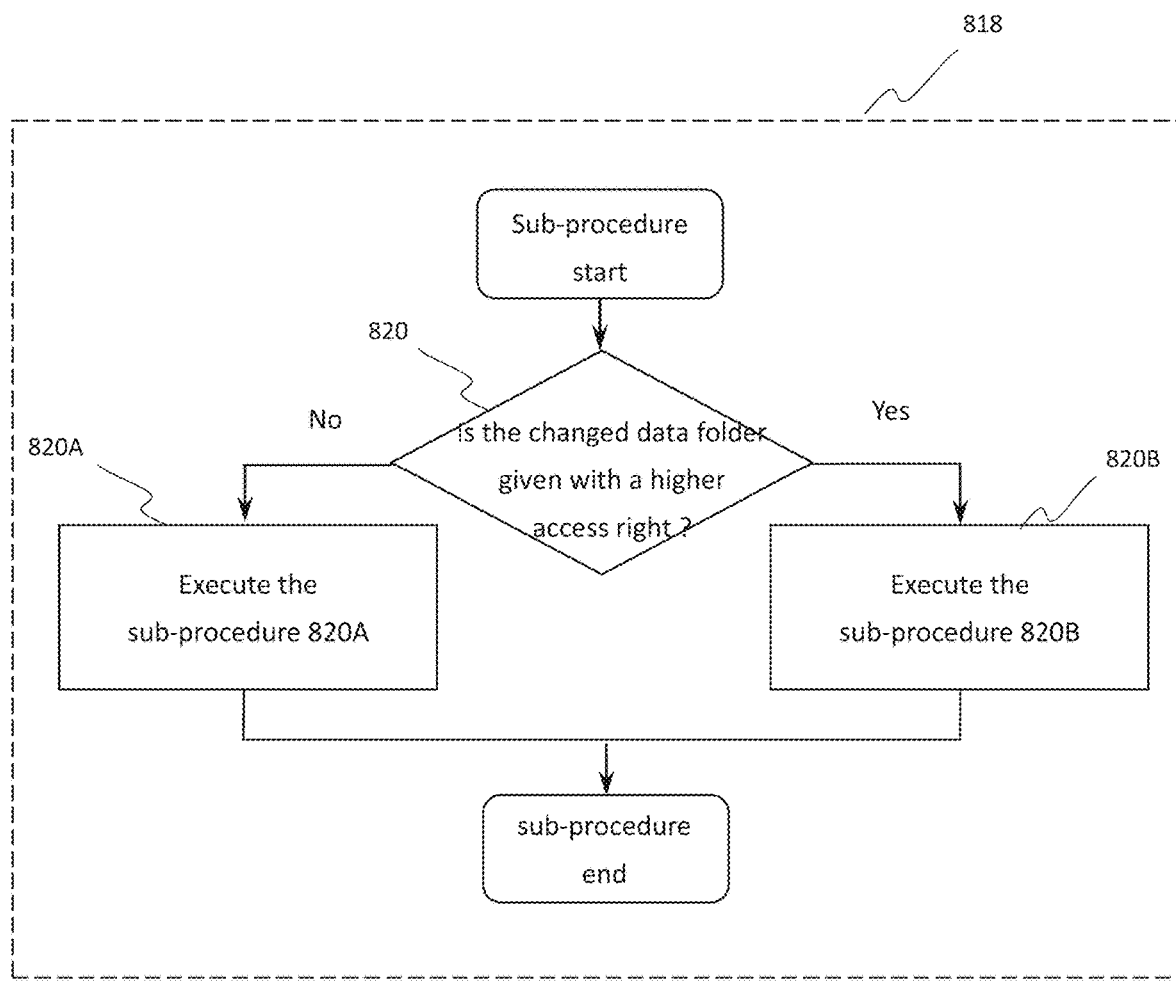
FIG. 9A shows a flowchart of the sub-procedure in each step 818 in FIG. 9.

In FIG. 9, since step 800, step 805, step 810 and step 815 respectively correspond to step 700, step 705, step 710 and step 715 in FIG. 8, please refer to the aforesaid detailed descriptions regarding step 700, step 705, step 710 and step 715 in FIG. 8 for step 800, step 805, step 810 and step 815 in FIG. 9 respectively, and therefore the details are omitted here. When the process flow goes to step 818 in FIG. 9, since this embodiment allows one or more folders being respectively changed with the settings of access rights in the global access control information 92 at the same time in an independent manner, for each of the folders whose settings of access rights have been changed, there must be a corresponding sub-procedure presented by step 818, and these sub-procedures of step 818 are respectively executed for the folders in an independent manner. As shown in FIG. 9, FIG. 9 shows many sub-procedures of many steps 818 for many folders, for example, "for folder 1", "for folder 2" . . . "for folder N", which are respectively executed in the independent manner, where the "folder 1", "folder 2" . . . "folder N" represent the folder numbers whose access rights have been changed. The sub-procedure 818 for each folder is shown in FIG. 9A. Step 820, step 820A, step 820B in FIG. 9A respectively correspond to step 720, step 720A, and step 720B in FIG. 8, so please refer to the aforesaid detailed descriptions regarding step 720, step 720A, and step 720B for step 820, step 820A, step 820B in FIG. 9A respectively, and therefore the details are omitted here. In summary, in the sub-procedure 818, for each of the folders whose access rights has been changed, step 820 determines if the associated folder is given with a higher access right. If the determination is made no, then the sub-procedure of step 820A that corresponds to step 820A will be executed. If the determination is made yes, then the sub-procedure of step 820B that corresponds to step 820B will be executed. The sub-procedure 820A is shown in FIG. 9B, and the sub-procedure 820B is shown in FIG. 9C.

Figure 9B:
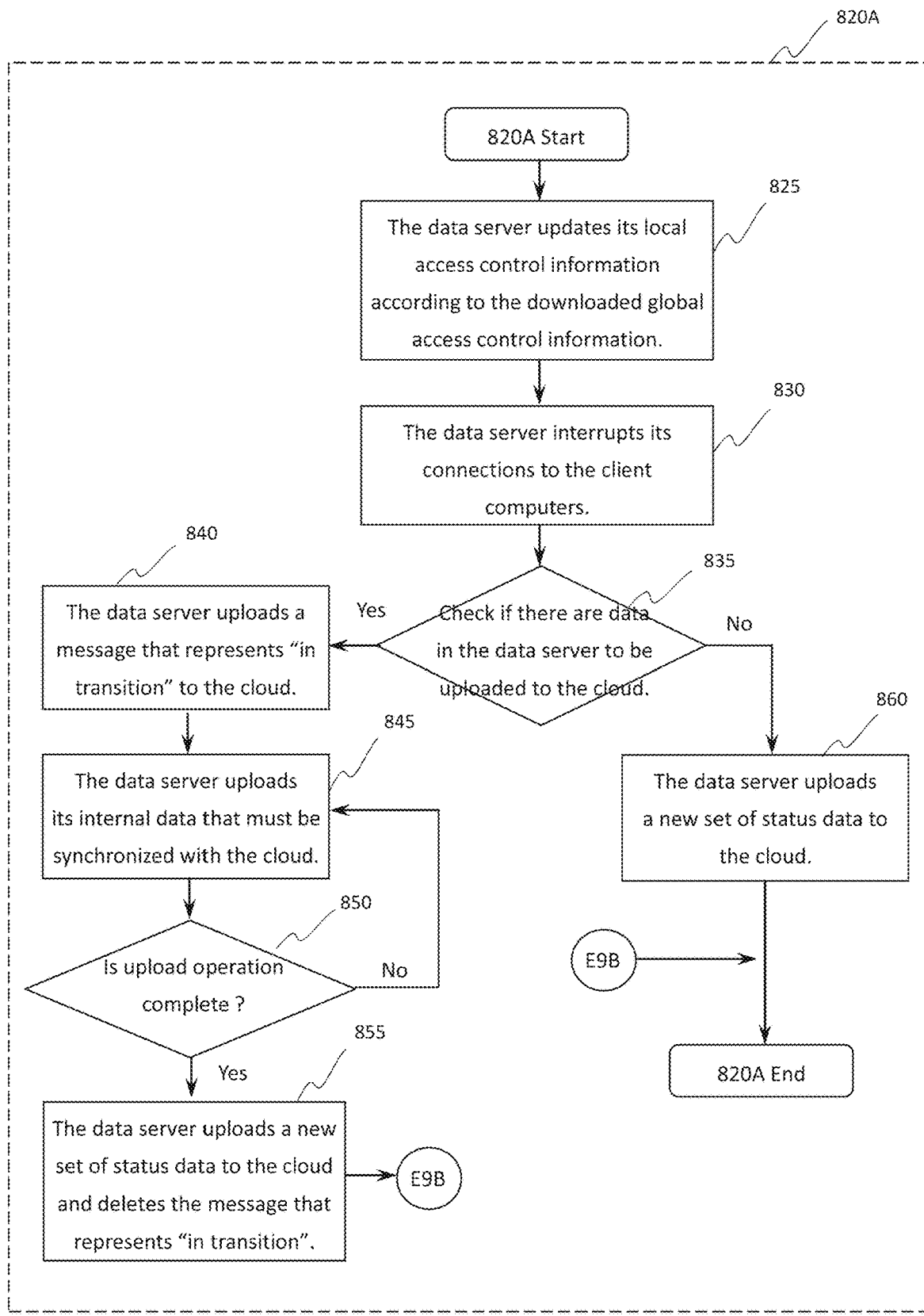
FIG. 9B shows a flowchart of the sub-procedure in step 820A in FIG. 9A.
Figure 9C:
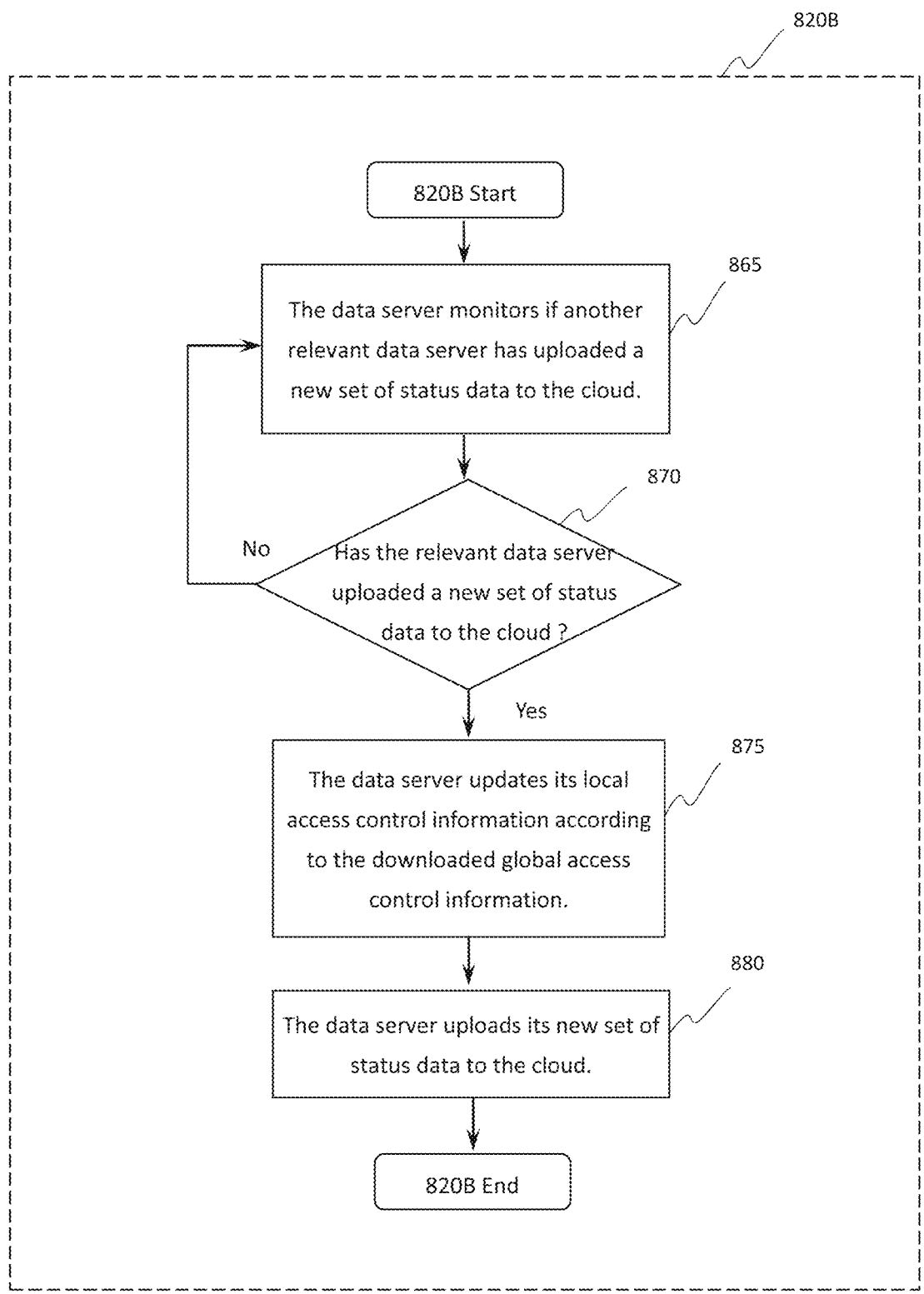
FIG. 9C shows a flowchart of the sub-procedure in step 820B in FIG. 9A.

The sub-procedure 820A in FIG. 9B is very similar to the sub-procedure 720A in FIG. 8A. Step 825, step 835, step 840, step 845, step 850, step 855 and step 860 in FIG. 9B respectively correspond to step 725A, step 735, step 740, step 745, step 750, step 755 and step 760 in FIG. 8A, and thus, please refer to the aforesaid detailed descriptions regarding step 725A, step 735, step 740, step 745, step 750, step 755, step 760 in FIG. 8A for step 825, step 835, step 840, step 845, step 850, step 855 and step 860 in FIG. 9B respectively, and the details are omitted here. To compare FIG. 9B with FIG. 8A, because the second embodiment presented in FIG. 9B allows plural different folders to be changed with their access right settings at the same time, and these changes for the access right settings of plural different folders are independently carried out, the client computers 500 which are connected to the folders whose access rights are changed can be different. Thus, in step 830 of FIG. 9B, the data server 300 can respectively interrupt the connections between each of the client computers 500 and its associated folders whose access rights are changed. In other words, in step 830, the client computers, which are indicated by the statement of "the client computers whose connections to the data server 300 are interrupted by the data server 300", can be the client computers which are connected to a specific folder of the data server 300. Likewise, the sub-procedure 820B in FIG. 9C is very similar to the sub-procedure 720B in FIG. 8B, step 865, step 870, step 875 and step 880 in FIG. 9C respectively correspond to step 765, step 770, step 775 and step 780 in FIG. 8B, the detailed descriptions of which are explained above, and thus, the details are omitted here.

Please refer to FIG. 10, FIG. 10A, FIG. 10B, FIG. 10C, and FIG. 10D. According to another embodiment of the present invention, FIG. 10, FIG. 10A, FIG. 10B, FIG. 10C, and FIG. 10D collectively show another handling procedure, executed by one of the data servers 300, in response to the administrator's changes on the settings of the global access control information 92. Compared to the aforesaid FIG. 9, FIG. 9A, FIG. 9B, and FIG. 9C, the third embodiment shown in FIG. 10, FIG. 10A, FIG. 10B, FIG. 10C, and FIG. 10D can also let one or more folders be changed with the settings of the access rights in the global access control information 92 at the same time. However, the difference between these two embodiments is that the third embodiment represented by FIG. 10, FIG. 10A, FIG. 10B, FIG. 10C, and FIG. 10D does not respectively handle each of the folders whose access rights have been changed, but provides a process considering all the folders together whose access rights have been changed. The third embodiment represented by FIG. 10, FIG. 10A, FIG. 10B, FIG. 10C, and FIG. 10D can be executed by any of the data servers 300 in FIG. 2, as long as that data server 300 detects change of the settings of associated folders in the cloud data storage system 100.

Figure 10:
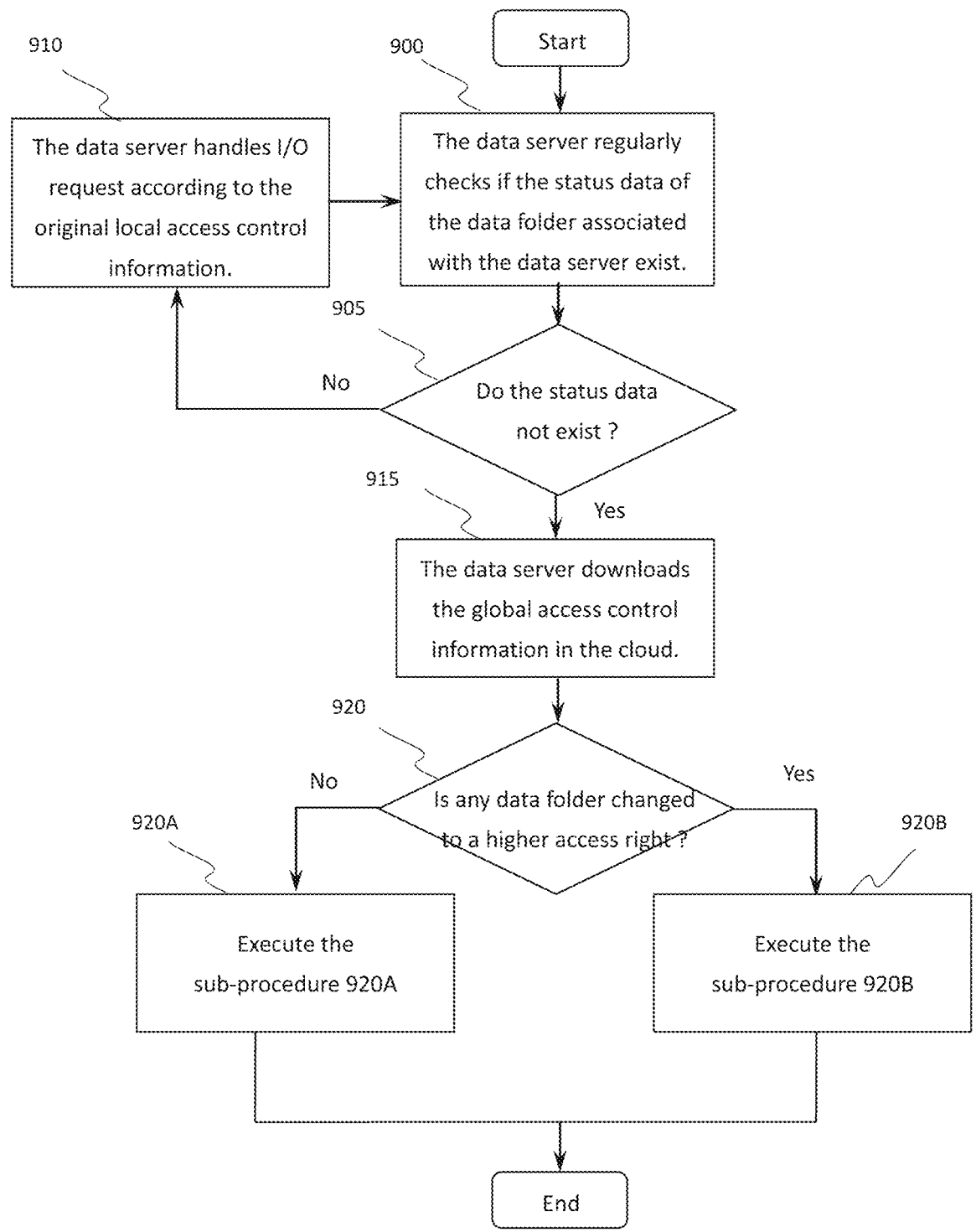
FIG. 10 shows a flowchart of the handling procedure executed by one of the data servers after the settings of the global access control information are changed according to another embodiment of the present invention.

Because step 900, step 905, step 910, step 915 in FIG. 10 respectively correspond to step 700, step 705, step 710, step 715 in FIG. 8, please refer to the aforesaid detailed descriptions of step 700, step 705, step 710, step 715 in FIG. 8 for step 900, step 905, step 910, step 915 in FIG. 10 respectively, and the details are omitted here. When the process flow in FIG. 10 goes to step 920, because this embodiment is to handle the situation that many folders have changes on the access right settings at the same time, the data server 300 should consider and determine if any one of many folders which are associated with the data server 300, and the access rights of which have been changed, is given with a higher access right in the global access control information 92. If the determination is made no, then the sub-procedure 920A that corresponds to step 920A will be executed. If the determination is made yes, then the sub-procedure 920B that corresponds to step 920B will be executed, where the sub-procedure 920A is shown in FIG. 10A, and the sub-procedure 920B is shown in FIG. 10B.

Figure 10A:
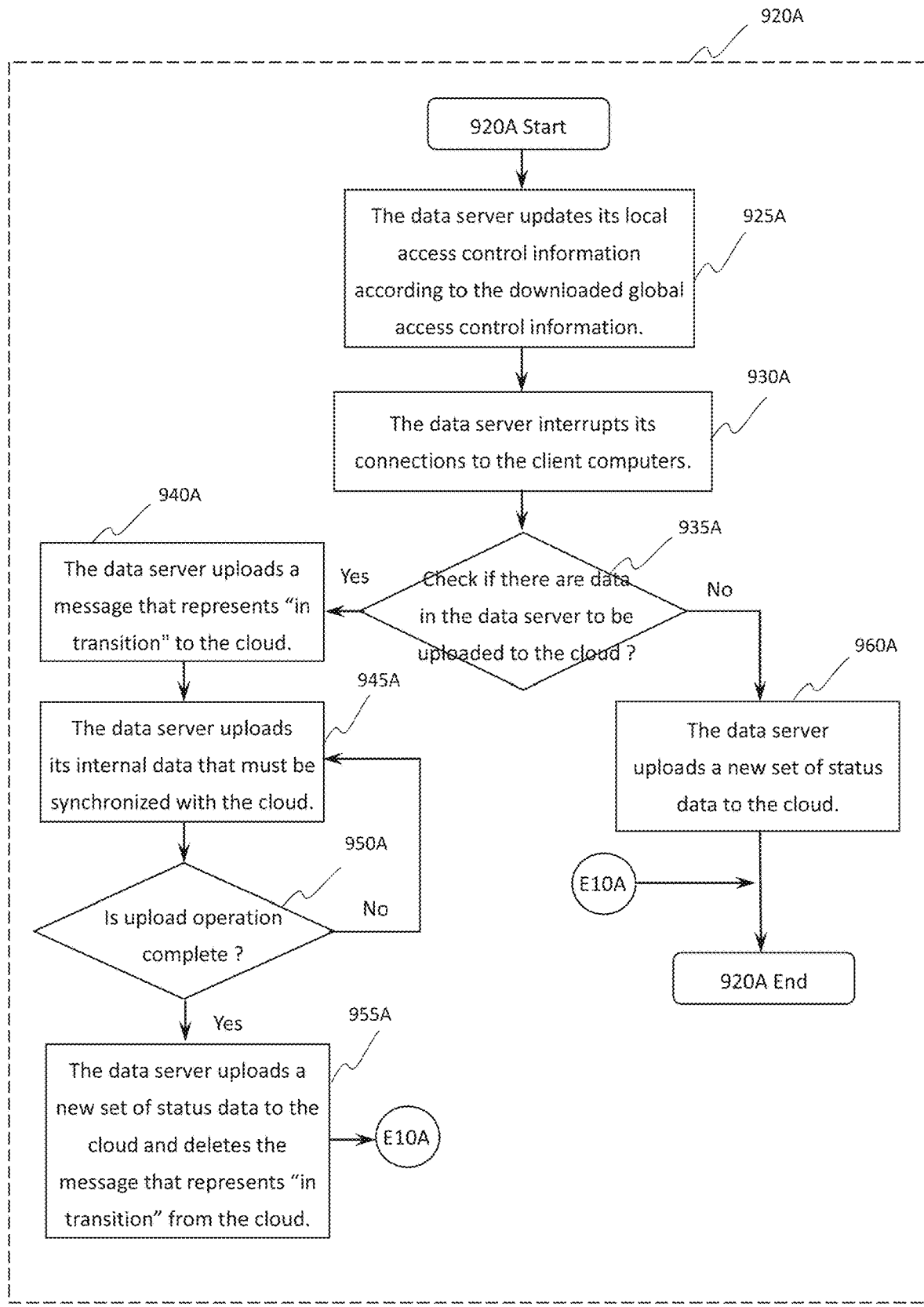
FIG. 10A shows a flowchart of the sub-procedure in step 920A in FIG. 10.

Because step 925A, step 930A, step 935A, step 940A, step 945A, step 950A, step 955A and step 960A in FIG. 10A respectively correspond to step 725A, step 730, step 735, step 740, step 745, step 750, step 755, step 760 in FIG. 8A, please refer to the aforesaid detailed descriptions regarding step 725A, step 730, step 735, step 740, step 745, step 750, step 755, step 760 in FIG. 8A for step 925A, step 930A, step 935A, step 940A, step 945A, step 950A, step 955A and step 960A in FIG. 10A respectively, and therefore the details are omitted here. The sub-procedure 920A in FIG. 10A shows a handling procedure after step 920 in FIG. 10, when the determination of step 920, i.e., if any one of many folders is given with a higher access right, is made no. When the process flow goes from step 920A into FIG. 10A, it means that all the access rights for these folders are changed from the higher access rights down to the lower access rights. In other words, entering the sub-procedure 920A means that in the latest settings of the global access control information 92, all the access rights for these folders associated with the data server 300 have been given with the lower access right, for example, from "Read and Write" down to "Read Only". Therefore, there is a need to determine if there are cache data in the data server 300 to be uploaded to the cloud but not to be synchronized yet. In addition, in step 930A, the handling procedure that "the data server 300 interrupts its connections to the client computers 500" is the same as the way of step 730 in FIG. 8, i.e., the data server 300 will interrupt its connections to all client computers 500, no matter whether these client computers are associated with the folders whose access rights have been changed.

Figure 10B:
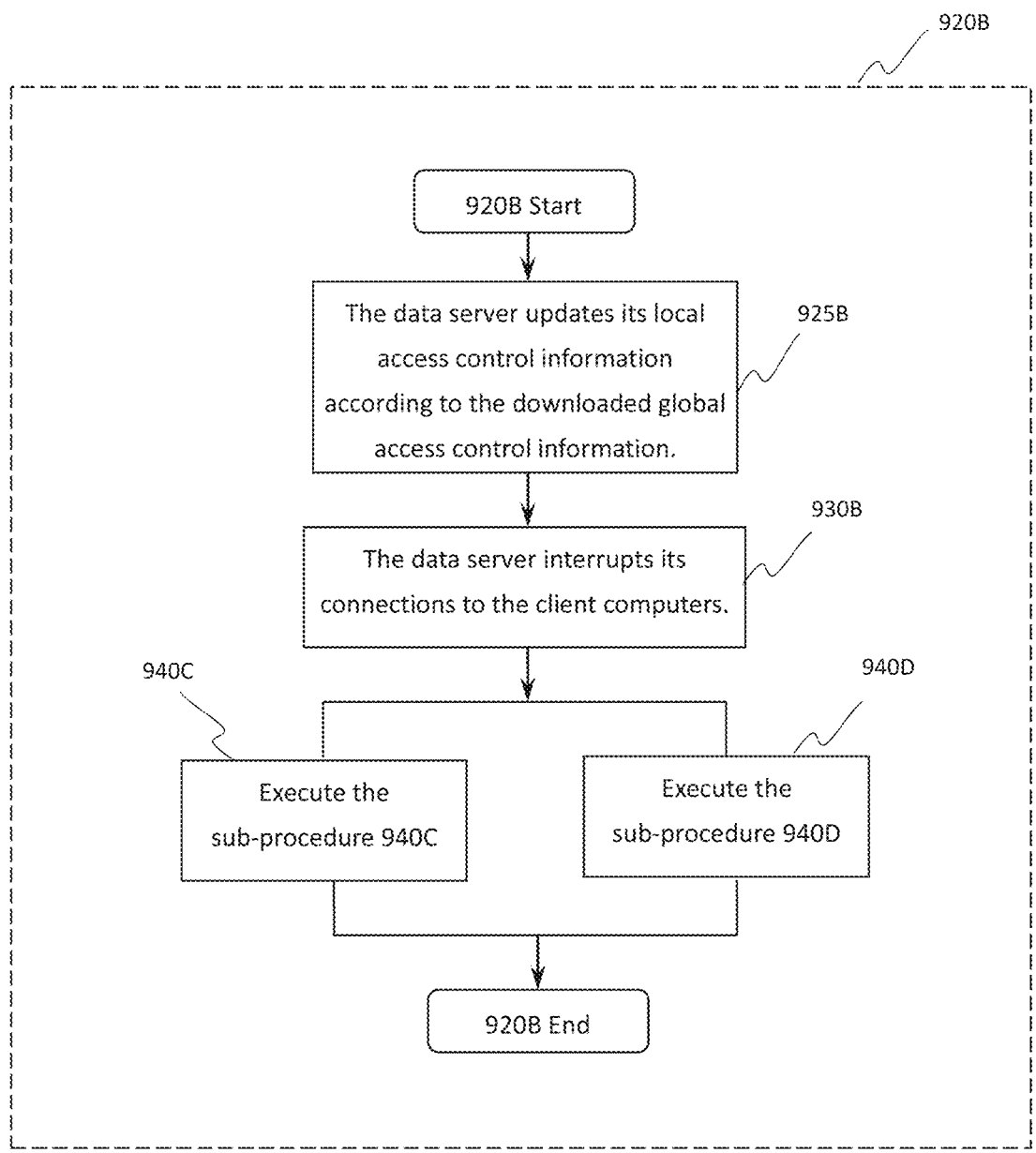
FIG. 10B shows a flowchart of the sub-procedure in step 920B in FIG. 10.

Please refer to FIG. 10B. According to one embodiment of the present invention, FIG. 10B shows a flowchart of sub-procedure 920B in FIG. 10. The sub-procedure 920B in FIG. 10B shows a handling procedure after step 920 in FIG. 10, when the determination of step 920, i.e., if any one of many folders is given with a higher access right, is made yes. When the process flow goes from step 920B in FIG. 10 to FIG. 10B, it means that among these many folders whose access rights have been changed, there is at least one of these folders, whose access right is given with a higher access right, from a lower access right. That is, among these folders which are associated with the data server 300, and the access rights of which have been changed, at least one of these folders is given with a higher access right, for example, from "Read Only" up to "Read and Write, and at the same time, the access rights for some of other folders may be given with a lower access right, for example, from "Read and Write" to "Read Only". If that is the case, the data server 300 has to consider the above-mentioned two situations (upgrade of the access right and downgrade of the access right) and further handle them. In one embodiment of the present invention, the data server 300 simultaneously handles the aforesaid two situations in an independent manner. Because step 925B, step 930B in FIG. 10B respectively correspond to step 725A and step 730 in FIG. 8A, please refer to the aforesaid detailed descriptions regarding step 725A and step 730 in FIG. 8A for step 925B, step 930B in FIG. 10B, and the details are omitted here. After step 930B in FIG. 10B is executed, the subsequent step 940C and step 940D respectively handle these two situations (upgrade of the access right for the folder and downgrade of the access right for the folder) in an independent manner, where the sub-procedure 940C which corresponds to step 940C is used to handle the downgrade situation, and the sub-procedure 940D which corresponds to step 940D is used to handle the upgrade situation. Please be noted that for some data server 300, when the process flow enters from step 920B in FIG. 10 to FIG. 10B, that means that among these folders whose access rights have been changed and associated with the data server 300, there is at least one of these folders, whose access right is changed from the lower access right to the higher access right. It means that one or more of these folders is(are) given with the higher access right(s), and the rest of these folders are given with the lower access rights, or in the second situation where all these folders, which are associated with the data server 300, and the access rights of which has been changed, are given with the higher access rights. If the second situation is the case, i.e., upgrading all of the access rights of the folders, there is no need for the data server 300 to enter and execute step 940C which corresponds to FIG. 10C.

Figure 10C:
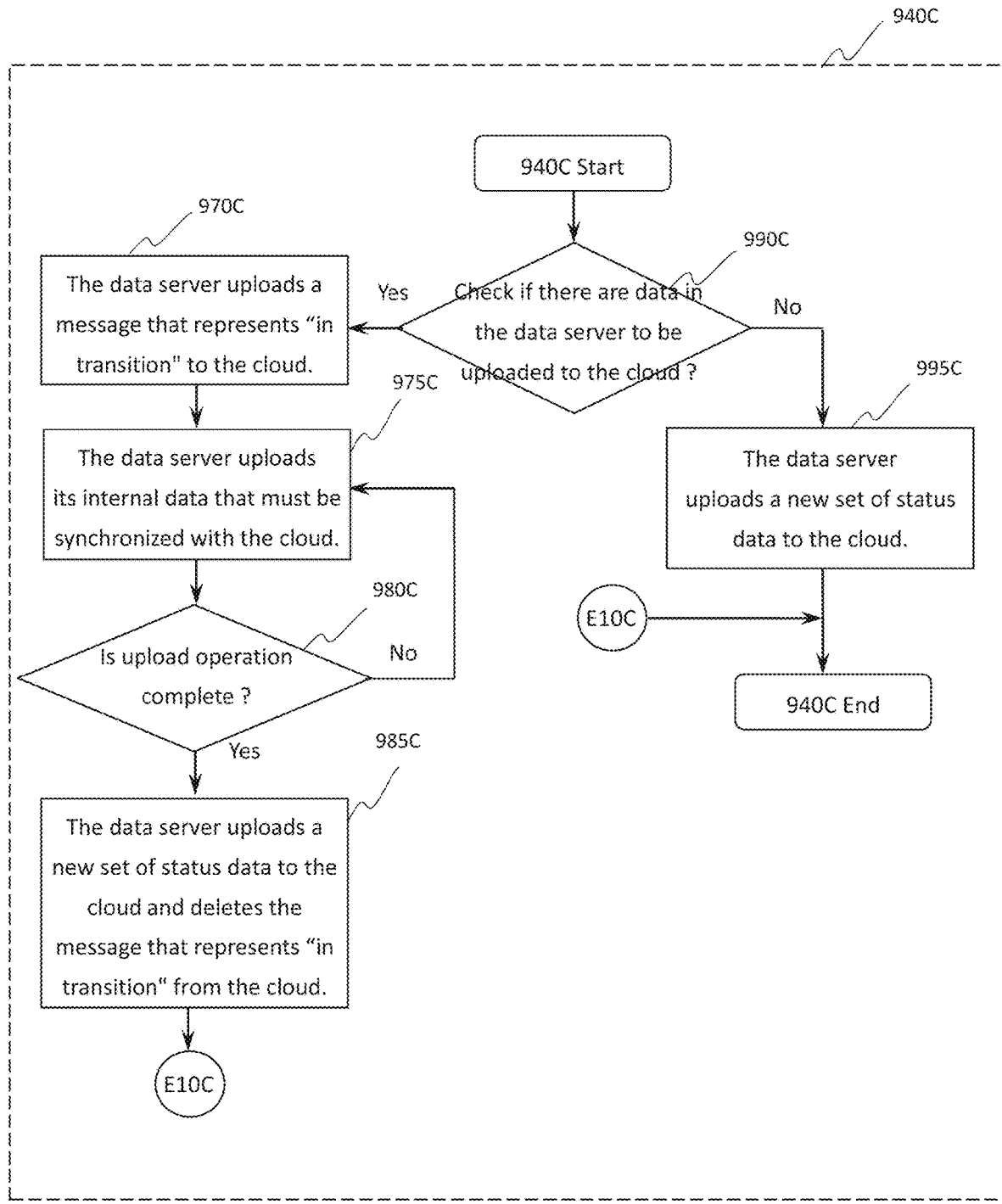
FIG. 10C shows a flowchart of the sub-procedure in step 940C in FIG. 10B.
Figure 10D:
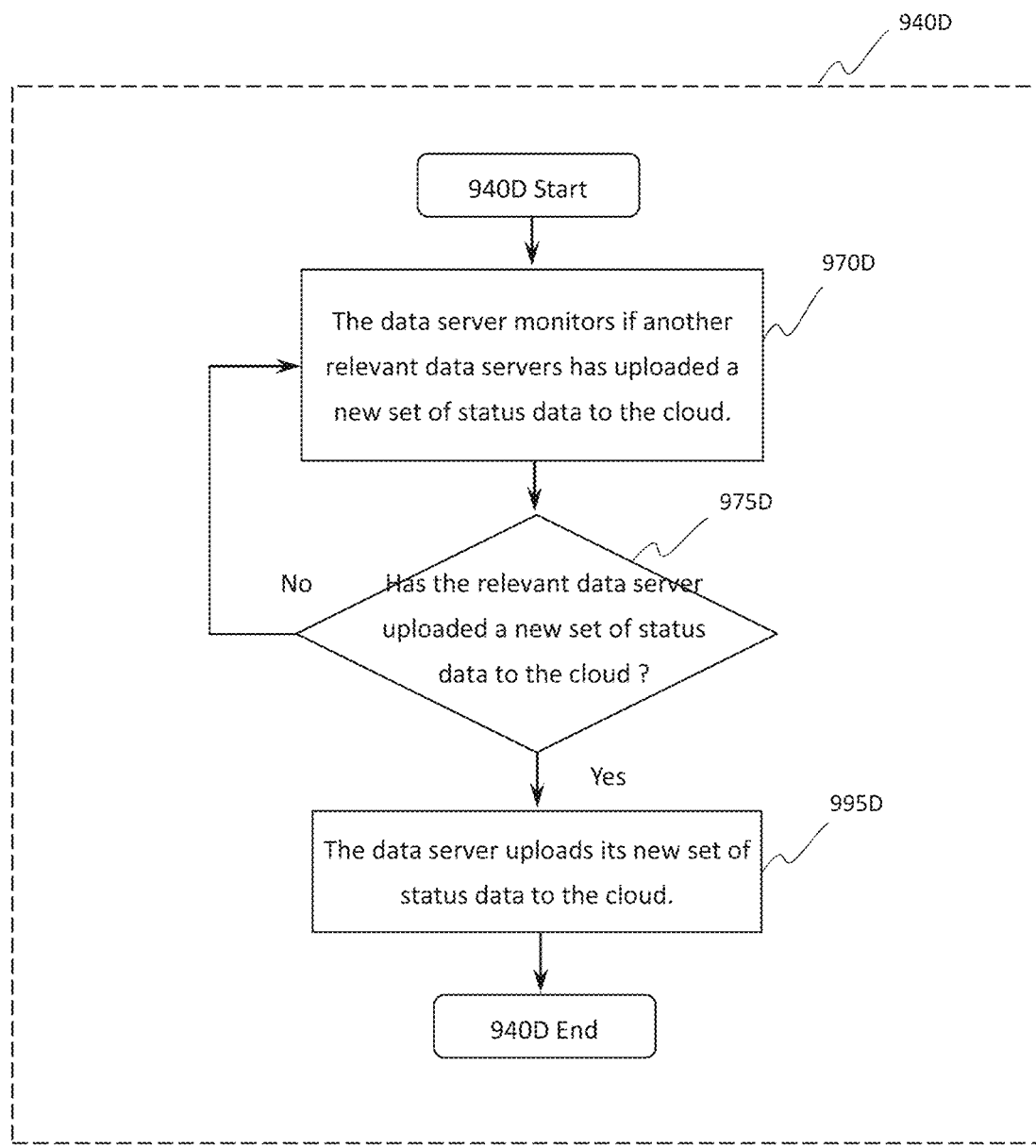
FIG. 10D shows a flowchart of the sub-procedure in step 940D in FIG. 10B.

Please refer to FIG. 10C and FIG. 10D. Because step 990C, step 995C, step 970C, step 975C, step 980C and step 985C in FIG. 10C respectively correspond to step 735, step 760, step 740, step 745, step 750, step 755 in FIG. 8A, please refer to the aforesaid detailed descriptions of step 735, step 760, step 740, step 745, step 750, step 755 in FIG. 8A for step 990C, step 995C, step 970C, step 975C, step 980C and step 985C in FIG. 10C, and the details are omitted here. Likewise, because step 970D, step 975D, step 995D in FIG. 10D respectively correspond to step 765, step 770, step 780 in FIG. 8B, please refer to the aforesaid detailed descriptions regarding step 765, step 770, step 780 in FIG. 8B for step 970D, step 975D, step 995D in FIG. 10D, and the details are omitted here.

Figure 11:
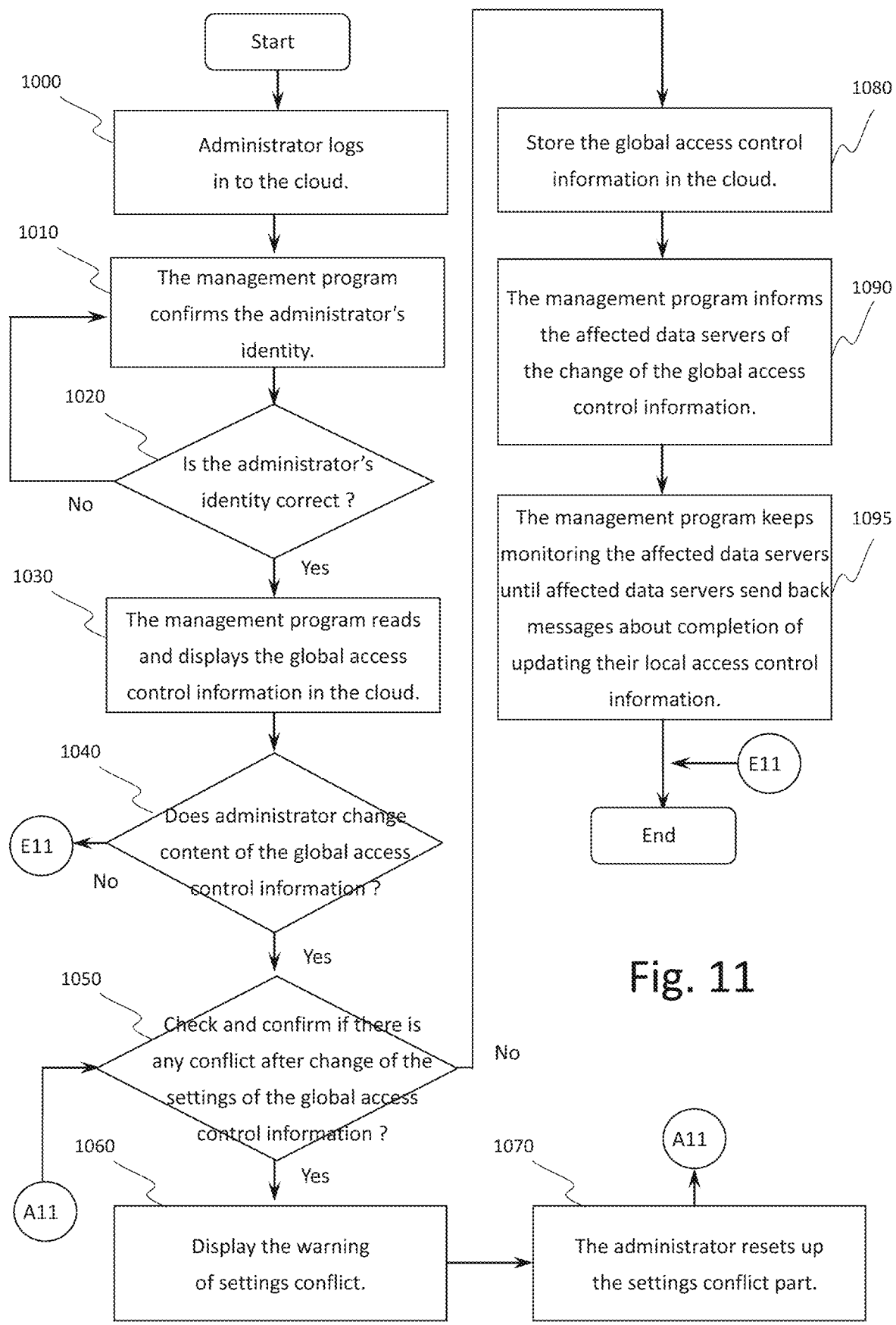
FIG. 11 shows a flowchart for changing the settings of the global access control information according to another embodiment of the present invention.

Please refer to FIG. 11. According to another embodiment of the present invention, FIG. 11 shows another flowchart of administrator's changing on the content of the global access control information 92. The administrator may change the global access control information 92 in the cloud storage unit 200 through any one of the data server A 300, the data server B 300, and the data server C 300 in FIG. 2. In the present embodiment, the global access control information 92 is still stored in the cloud, but the difference between this embodiment and that embodiment in FIG. 7 is that in the cloud, there are no status data for the folders, which are associated with each of the data servers 300. In other words, in the embodiment, each of the data servers 300 knows the changes of the access rights for the associated folders neither through determining if in the cloud, there exist the status data which are associated with that data server 300 nor through uploading the "in transition" message to the cloud for informing other data servers 300 of its status, but through the network 350 or network 380 in FIG. 2 to directly communicate with one another. In FIG. 11, the process flow begins with step 1000.

In step 1000, the administrator logs in to the cloud, the details of which are already explained in step 600 in FIG. 7. Please refer to the aforesaid detailed descriptions regarding step 600 of FIG. 7 for step 1000 of FIG. 11.

In step 1010, the management program confirms the administrator's identity, the details of which are already explained in step 610 in FIG. 7. Please refer to the aforesaid detailed descriptions regarding step 610 of FIG. 7 for step 1010 of FIG. 11.

In step 1020, the management program determines, through correctness of the password, whether the administrator's identity is correct or not. If the determination is made yes, then step 1030 will be executed, and if the determination is made no, then the process flow will go back to step 1010, the details of which are already explained in step 620 in FIG. 7. Please refer to the aforesaid detailed descriptions regarding step 620 of FIG. 7 for step 1020 of FIG. 11.

In step 1030, the data server 300 reads and displays the content of the global access control information 92 through the management program, the details of which are already explained in step 630 in FIG. 7. Please refer to the aforesaid detailed descriptions regarding step 630 of FIG. 7 for step 1030 of FIG. 11.

In step 1040, the management program determines if the content of the global access control information 92 have been changed. If the determination is made no, then the settings of the global access control information 92 will be ended. If the determination is made yes, then the process flow will execute the determination of step 1050.

In step 1050, the management program checks and confirms if the global access control information 92 has a conflict after the change of the settings of the global access control information 92? If it is determined that there exists the conflict after change of the settings, then step 1060 will be executed. If it is determined that there does not exist conflict after change of the settings, then step 1080 will be executed. The details of step 1050 are already explained in step 650 in FIG. 7. Please refer to the aforesaid detailed descriptions regarding step 650 of FIG. 7 for step 1050 of FIG. 11.

In step 1060, the management program shows a warning for the conflict in the settings, the details of which are already explained in step 660 in FIG. 7. Please refer to the aforesaid detailed descriptions regarding step 660 of FIG. 7 for step 1060 of FIG. 11.

In step 1070, the administrator re-sets up the conflict part of the settings, the details of which are already explained in step 670 in FIG. 7. Please refer to the aforesaid detailed descriptions regarding step 670 of FIG. 7 for step 1070 of FIG. 11.

In step 1080, the management program stores the updated global access control information 92, into the cloud, the details of which are already explained in step 680 in FIG. 7. Please refer to the aforesaid detailed descriptions regarding step 680 of FIG. 7 for step 1080 of FIG. 11.

In step 1090, the management program informs the affected data servers 300 of the change of the global access control information 92. In the embodiment, because the data servers 300 directly communicate with one another through the network, and the management program is executed in one of the data servers 300, the management program directly informs the data servers 300 that are affected due to the changes on the access rights of the folders, of the fact that the global access control information 92 in the cloud has been changed. When the affected data servers 300 receive such change information, the affected data servers 300 have to download the latest global access control information 92 from the cloud, and update their local access control information 535 according to the latest global access control information 92. According to one embodiment of the present invention, after the management program informs the affected data servers 300, the management program will receive responses from the affected data servers 300 so as to confirm the affected data servers' 300 knowing that the global access control information 92 has been changed.

In step 1095, the management program keeps monitoring the affected data servers 300 until all affected data servers 300 send back messages about completion of updating their local access control information 535. In the embodiment, the management program knows whether the affected data servers 300 complete the update of the local access control information 535 not through detecting whether the affected data servers 300 have uploaded the status data of the relevant folders into the cloud, but through the data servers' 300 direct responses to the management program. After completing execution of step 1095, the change procedure for changing the global access control information 92 is ended. According to another embodiment of the present invention, after the management program informs, through one of the data servers 300, the affected data servers 300 that the global access control information 92 has been changed, the change procedure for changing the global access control information 92 is ended, and the management program will not monitor the affected data servers 300.

Figure 12:
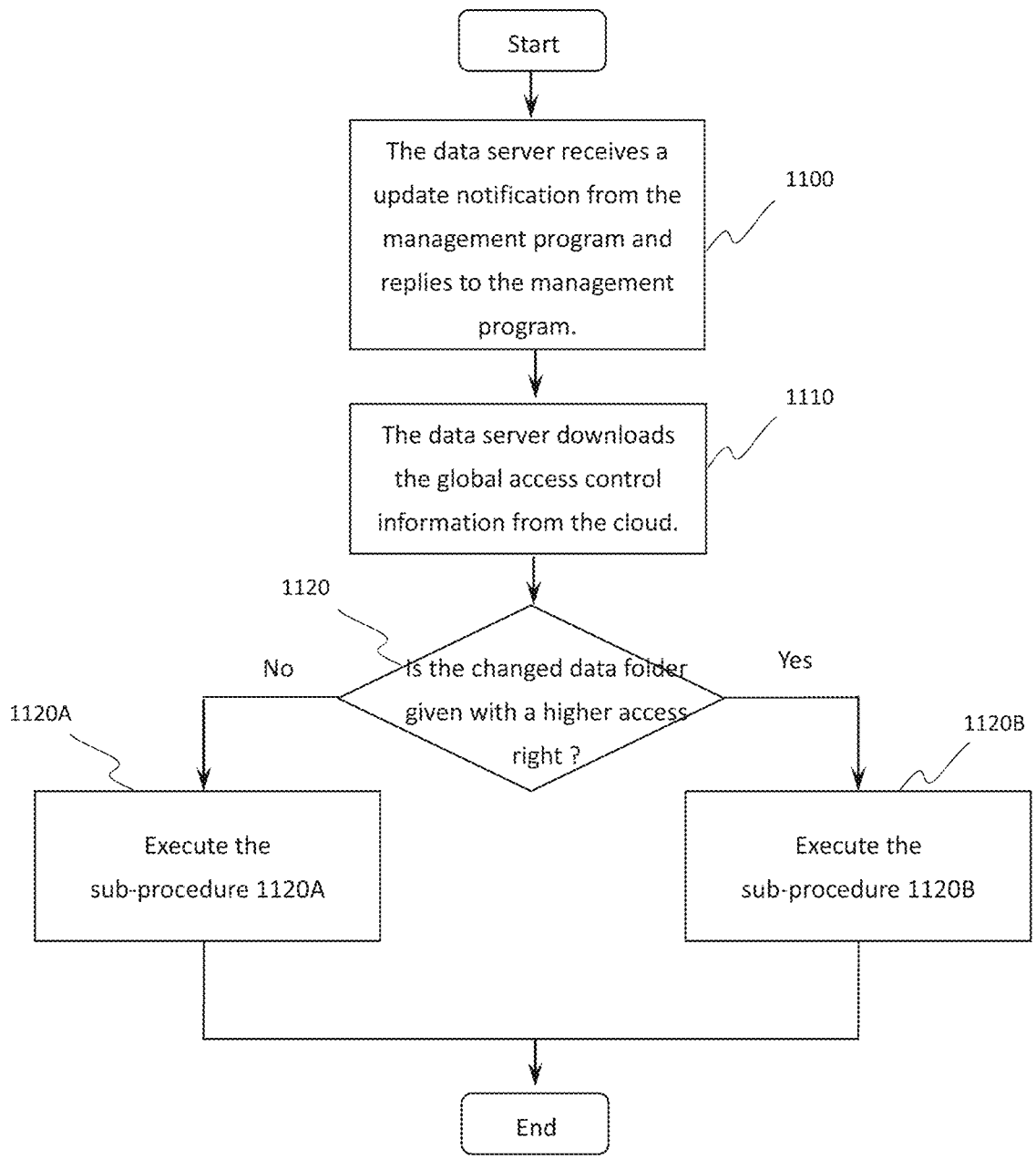
FIG. 12 shows a flowchart of the handling procedure executed by one of data servers after the settings of the global access control information are changed according to another embodiment of the present invention.
Figure 12A:
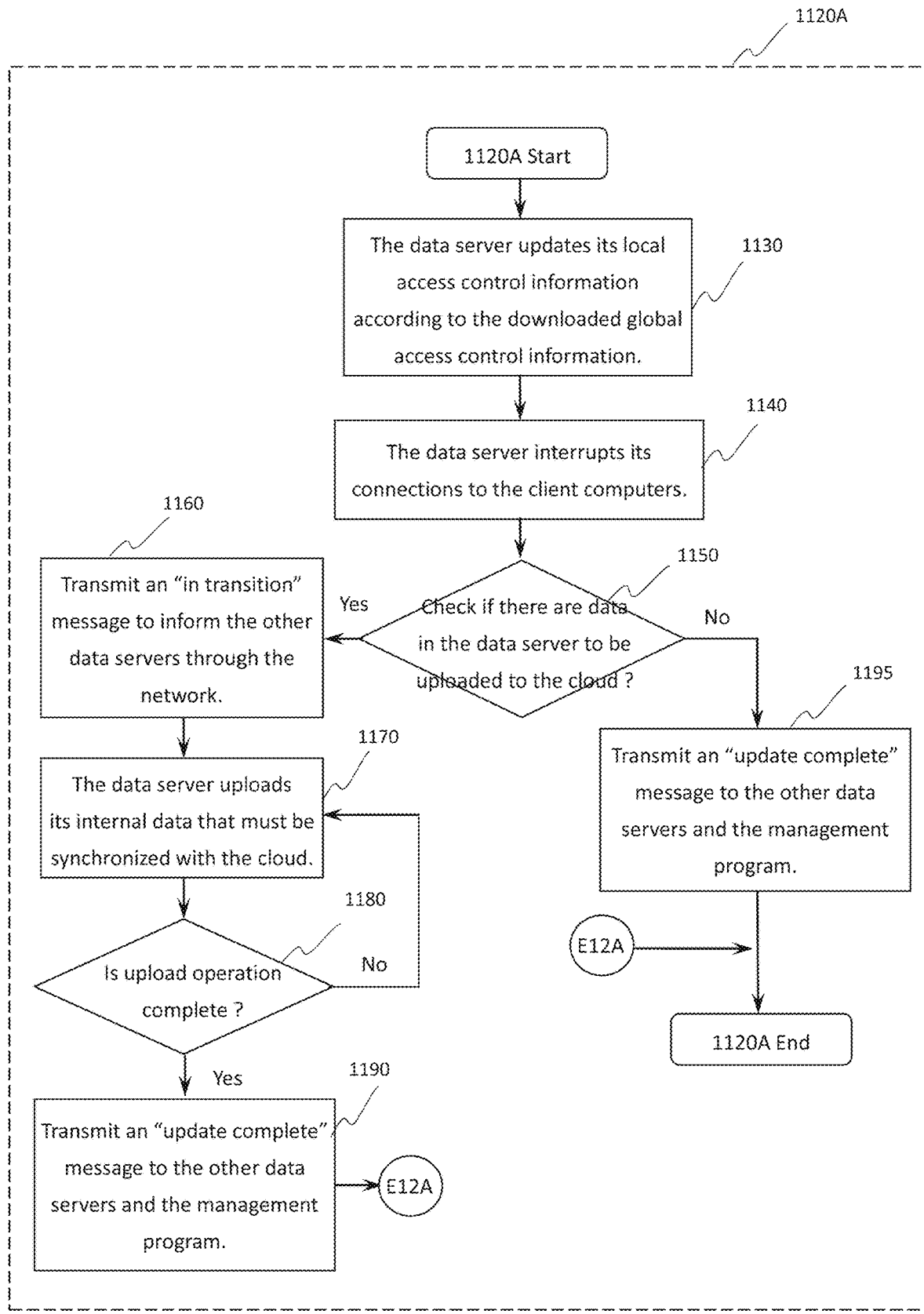
FIG. 12A shows a flowchart of the sub-procedure in step 1120A in FIG. 12.
Figure 12B:
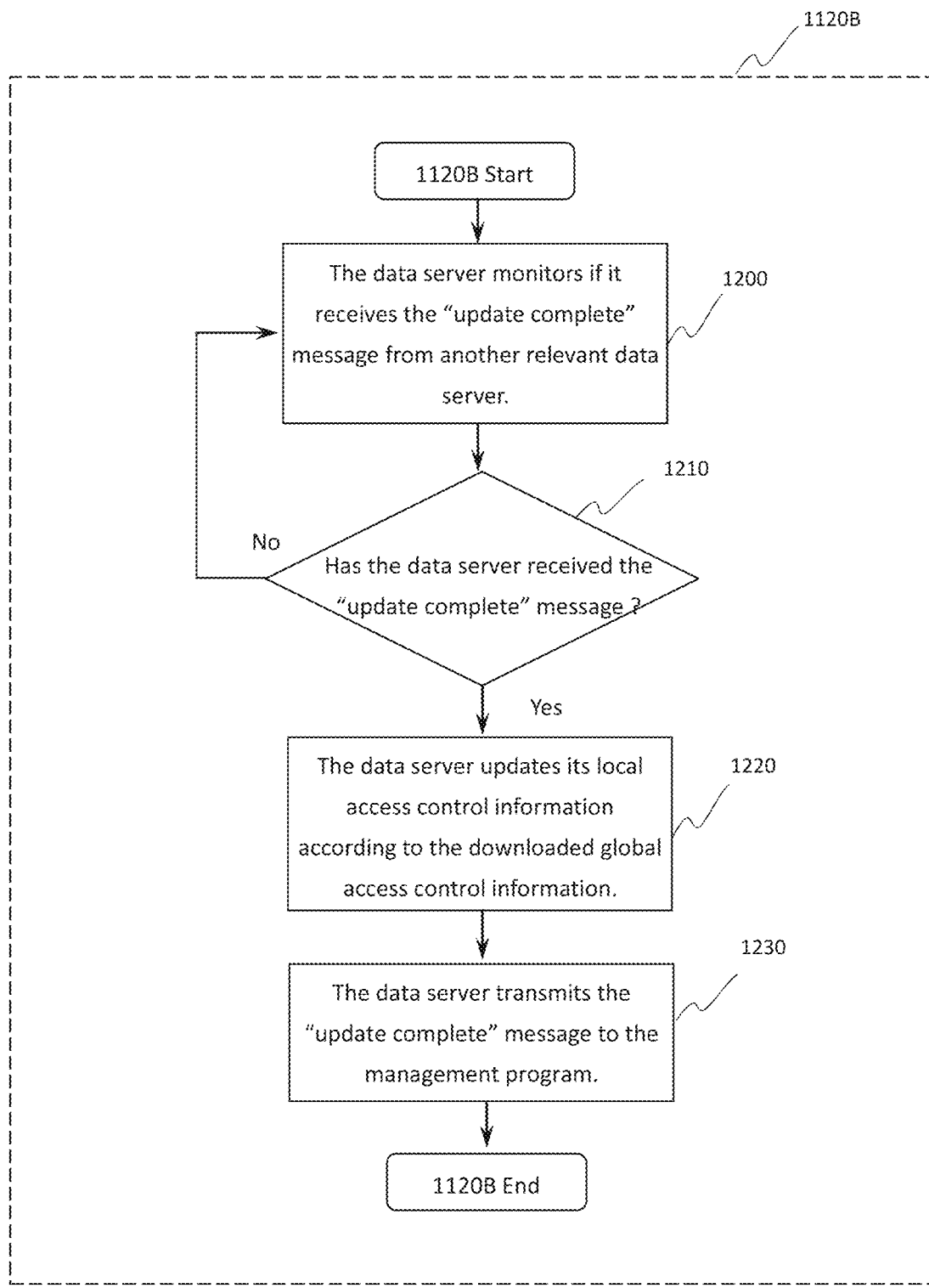
FIG. 12B shows a flowchart of the sub-procedure in step 1120B in FIG. 12.

Please refer to FIG. 12, FIG. 12A, and FIG. 12B. According to one embodiment of the present invention, FIG. 12, FIG. 12A, and FIG. 12B collectively show the handling procedure, executed by each of the data servers 300, in response to the administrator's changes on the settings of the global access control information 92. The embodiment shown in FIG. 12, FIG. 12A and FIG. 12B is executed by one of the data servers 300 in FIG. 2 in order to respond to the change of the settings of the global access control information 92. The handling procedure can be executed by any of the data servers 300, as long as that the data server 300 detects the changes made on the settings of the relevant folders of the data server 300, from the cloud data storage system 100. The handling procedure of FIG. 12, FIG. 12A, and FIG. 12B is not limited to a specific data server 300 which is used to change the settings of the global access control information 92 by the administrator. The flowcharts shown in FIG. 12, FIG. 12A, and FIG. 12B illustrate the handling procedure for only one folder whose settings of the access right have been changed. The flowcharts of FIG. 12, FIG. 12A and FIG. 12B represent that when the access right for some folder has been changed, each of the data servers 300 that are associated with such a change, has to execute the handling procedure which begins with step 1100.

In step 1100, the data server 300 receives an update notification about the update of the global access control information 92 from the management program, so the data server 300 knows that the access rights for its one or more folders have been changed, and there is a need for the data server 300 to update its local access control information 535 therein. Since in the global access control information 92, the corresponding relationships of the access rights between the data servers 300 and the relevant folders could be many, in the present embodiment only one folder, the settings of which are changed, is taken into account to explain the handling procedures performed by each of the data servers 300 associated with the one folder. After the data server 300 receives the update notification meaning that the global access control information 92 has been changed, from the management program, the data server 300 may reply an acknowledgement to the management program indicating that it has received the update notification and has learned that the global access control information 92 has been changed. If the access rights of the folders that are associated with some data server 300, are all not changed, it means that the associated data server 300 does not need to update its local access control information 535. In this situation, the management program may not send the update notification about the update of the global access control information, to that data server 300, and the data server 300 continues handling I/O requests issued from the client computers 500 according to the original local access control information 535.

In step 1110, the data server 300 downloads the global access control information 92 from the cloud into the date server 300. When the data server 300 receives the update notification about the update of the global access control information 92, it means that the administrator has changed the access right settings in the global access control information 92, for the folders that are associated with the data server 300. In other words, at that time point, the local access control information 535 in the data server 300 is inconsistent with the global access control information 92 with the part that is associated with that data server 300; therefore, that data server 300 has to download the latest global access control information 92 from the cloud. In one embodiment of the present invention, the data servers 300 will update its local access control information 535 and then handle I/O requests from client computers 500 according to the updated local access control information 535. In another embodiment of the present invention, the data server 300 handles I/O requests issued from the client computers 500 by directly using the latest global access control information 92 with the part, which is associated with the data server 300.

In step 1120, the data server 300 determines whether in the latest global access control information 92, the folder which is associated with the data server 300, and the settings of which have been changed, is given with a higher access right or not. If the determination is made no, then the sub-procedure 1120A that corresponds to step 1120A will be executed. If the determination is made yes, then the sub-procedure 1120B that corresponds to step 1120B will be executed. The sub-procedure 1120A is shown in FIG. 12A, and the sub-procedure 1120B is shown in FIG. 12B.

According to one embodiment of the present invention, assume that the data server 300 has only two sorts of access rights, i.e., "Read Only" and "Read and Write" to some folder, accordingly, the so-called "the folder that has been changed is given with a higher access right" in step 1120 means that after the data server 300 compares the global access control information 92 downloaded in step 1110, with its local access control information 535, it is found that the access right for the data server 300 to some folder is changed to a higher access right, i.e., from "Read Only" to "Read and Write". According to one embodiment of the present invention, as long as the access right for a data server 300 to a folder is changed to a higher access right, such as "Read and Write", there must be another data server 300 whose access right to the folder is changed to a lower access right, such as "Read Only". In this situation, the data server 300 whose access right is changed to the higher access right has to wait for another data server's 300 (whose access right is changed to the lower access right) completion of releasing the higher access right. That is, the data server 300 that is changed to the higher access right has to wait for another data server's 300 (that is changed to the lower access right) completion of releasing its higher access right, and another data server 300 that is changed to the lower access right will informs, through the network, the data server 300 that is changed to the higher access right, of its completion of the access right change procedure for the folder. Afterward, the data server 300 that is changed to the higher access right will start to execute its own access right change procedure for the folder so as to obtain the higher access right. Relatively, another data server 300 that is changed to the lower access right, does not need to wait for the data server's 300 completion of releasing the access right but can directly execute its access right change procedure for the folder. At last, the data server 300 informs, through the network, the rest of the data servers 300, of its completion of the access right change procedure for the folder.

Please refer to FIG. 12A. According to one embodiment of the present invention, FIG. 12A shows a flowchart of the sub-procedure of step 1120A. In step 1120 of FIG. 12, when the determination of step 1120, i.e., "if the folder with the access right change is given with a higher access right", is made no, the process flow will step into step 1120A and then execute the sub-procedure in FIG. 12A. The sub-procedure of FIG. 12A begins with step 1130.

In step 1130, the data server 300 updates its local access control information 535 according to the downloaded global access control information 92. When the process flow goes to step 1130, it means that in the settings of the latest global access control information 92, the access right for the data server 300 to some folder which is associated with the data server 300, is changed to the lower access right, for example, from "Read and Write" down to "Read Only". Because the access right is downgraded, in one embodiment of the present invention the data server 300 does not need to wait for another data server's 300 completion of releasing its higher access right, but can directly execute the access right change procedure for itself to the folder. According to another embodiment of the present invention, since the local access control information 535 in the data server 300 is just a part of the global access control information 92, after downloading the latest global access control information 92, the data server 300 may directly use the global access control information 92 as the local access control information 535 in the data server 300, and there is no need for the data server 30 to further filter out the part of settings regarding the data server 300.

In step 1140, the data server 300 interrupts its connections to the client computers 500. It is the situation that the access right for the data server 300 to some folder is changed to the lower access right, for example, from "Read and Write" down to "Read Only". According to one embodiment of the present invention, as long as the access right for a data server 300 to some folder is changed to the lower data right, the data server 300 will interrupts its connections to all client computers 500. According to another embodiment of the present invention, for some client computers 500 that are connected to the data server 300, if the folder whose access right has been changed, is not related to the I/O requests issued from some client computers 500, then the data server 300 does not need to interrupt its connections to these unaffected client computers 500.

Again, if the access right for a data server 300 to a folder is changed to a lower access right, it means that the data server 300 originally had a higher access right to that folder, for example, "Read and Write". Therefore, during a change phase of the access right, the data server 300 could be performing a write operation writing data from one of the client computers 500 into one or more files in the folder, or could has temporarily stored write data of the previous write operation. Because the write data that are temporarily stored have not been uploaded to the cloud for storing, the temporarily stored write data can be regarded as cache data, and the data server 300 has to upload the cache data to the cloud for storing.

In step 1150, the data server 300 checks and determines if in the data server 300, there are any cache data to be uploaded to the cloud. If the determination is made yes, then step 1160 will be executed. If the determination is made no, then step 1195 will be executed. As above-mentioned, because the access right for the data server 300 to the folder is changed to the lower access right, during the change phase of the access right, there could exist the write data (i.e., cache data) in the data server 300, to be uploaded to the cloud for storing, and the data server 300 has to determine during the change phase for the access right, if there are the cache data to be uploaded to the cloud for storing.

In step 1160, the data server 300 transmits an "in transition" message to inform the other data servers 300 through the network. The purpose of this step is to make the other data servers 300, which have to wait for the data server's 300 completion of the access right change procedure, understand the current access right change status of the data server 300. Taking into consideration that the data amount to be uploaded to the cloud for storing could be large, and it could take much time to upload the data to the cloud for storing, in order to prevent the rest of the data servers 300 from mistakenly determining that the data server 300 is broken-down during that upload time, before the data server 300 uploads the cache data to the cloud, the data server 300 may first transmit an "in transition" message to the other data servers 300 through the network, so that the rest of the data servers 300 can understand the current status regarding the data server 300.

In step 1170, the data server 300 uploads its cache data that has to be synchronized with the cloud, to the cloud. As the above-mentioned, the data amount of the cache data could be large; therefore, how much time the cache data will take to be uploaded to the cloud for storing mostly depends on the data amount of the cache data.

In step 1180, the data server 300 determines if the operation regarding uploading the cache data to the cloud is complete. If the determination is made yes, then step 1190 will be executed. If the determination is made no, then the process flow goes back to step 1170 to continue executing the operation regarding the data server's 300 uploading its cache data which have to be synchronized with the cloud, into the cloud for storing.

In step 1190, the data server 300 sends an "update complete" message to the other data servers 300 and to the management program through the network so as to inform the other data servers 300 and the management program of this status. According to one embodiment of the present invention, after the data servers 300 completes its uploading the cache data, the update procedure for its local access control information 535 may be regarded as complete, and the data server 300 may inform the other data servers 300 and the management program of such a complete status through the network. Accordingly, the data server 300 sends the "update complete" message to the rest of the data servers 300 and the management program. After execution of step 1190, the sub-procedure of step 1120A is ended, and when this step is executed by the data server 300, the access right update procedure for the data server 300 to the associated folder is complete.

The process flow goes back to aforesaid step 1150. In step 1150, when the determination is made no, then step 1195 will be executed.

In step 1195, the data server 300 sends an "update complete" message to the other data servers 300 and the management program through the network so as to inform the other data servers 300 and the management program of this status. When the process flow goes to step 1195, it means that in the data server 300, there are no cache data needed to be uploaded to the cloud, and the data server 300 has completed updating its local access control information 535. Therefore, the data server 300 informs the other data servers 300 and the management program, of the "update complete" message, which means that the local access control information 535 in the data server 300 has synchronized with the global access control information 92 in the cloud. After execution of step 1195, the sub-procedure of step 1120A is ended. That is, the data server 300 has completed the update procedure of the access right for the folder, which is associated with the data server 300.

Please refer to FIG. 12B. According to one embodiment of the present invention, FIG. 12B shows a flowchart of the sub-procedure of step 1120B in FIG. 12. When in FIG. 12, the determination of step 1120, i.e., if the folder with changed access right settings is to be given with a higher access right", is made yes, the process flow goes to step 1120B and executes the sub-procedure in FIG. 12B. The sub-procedure in FIG. 12B begins with step 1200.

In step 1120 of above FIG. 12, when the determination is made yes, it means that the data server 300 determines that the associated folder whose access right has been changed, is given with a higher access right, for example, from "Read Only" up to "Read and Write", and then the sub-procedure of step 1120B will be executed.

In step 1200, the data server 300 monitors if the data server 300 has received the "update complete" message from another relevant data server 300 through the network, where "another relevant data server 300" refers to another data server 300 whose access right to the associated folder has been changed, and especially, in step 1200, refer to the relevant data server 300 whose higher access right to the associated folder should be released. As the above-mentioned, when the access right for the data server 300 to a specific folder is going to be given with a higher access right, for example, from "Read Only" up to "Read and Write", the data server 300 has to wait for the release of the higher access right from the relevant data server 300. Afterward, the data server 300 executes the access right change procedure for the specific folder, and then handles, according to the higher access right, I/O requests issued from the client computers 500 to the specific folder, where the way of releasing the access right by the relevant data server 300 can be done by completing the access right change procedure for the specific folder and sending the "update complete" message to the associated data server 300. Therefore, in step 1200, the data server 300 has to monitor if the data server 300 has received the "update complete" message from another relevant data server 300 whose access right to the folder is changed, in order to make sure whether the relevant data server 300 has completed the access right change procedure for the folder or not.

In step 1210, the data server 300 determines if the data server 300 has received the "update complete" message from another relevant data server 300. If the determination is made no, then the process flow will go back to the step 1200 for keeping waiting for. If the determination is made yes, then step 1220 will be executed.

In step 1220, the data server 300 updates its local access control information 535 according to the downloaded global access control information 92. Because the access right for the data server 300 to the associated folder is given with a higher access right, for example, from "Read Only" up to "Read and Write", and the relevant dater server 300 has completed the access right change procedure for the associated folder, at this moment the data server 300 may start to execute its access right change procedure for the associated folder. In step 1220, the data server 300 updates its local access control information 535 according to the downloaded global access control information 92 that is downloaded in step 1110. According to another embodiment of the present invention, because the settings of the local access control information 535 in the data server 300 is just a part of the global access control information 92, after downloading the latest global access control information 92, the data server 300 can directly use the global access control information 92 as the local access control information 535, and there is no need to further filter out the part of settings regarding the data server 300.

In step 1230, the data server 300 transmits an "update complete" message to the management program though the network. Because the data server 300 may only have a "Read Only" access right to the associated folder prior to updating the global access control information 92, the data server 300 should not have any cache data needed to be uploaded to the cloud for the associated folder, and thus, the data server 300 does not need to upload the cache data to the cloud. Moreover at this moment, the data server 300 has completed updating its local access control information 535, so the data server 300 has to transmit the "update complete" message to the management program through the network in order to indicate that the local access control information 535 therein has been synchronized with the global access control information 92 in the cloud. After completion of executing step 1230, the sub-procedure of step 1120B is ended. At the time of going into this step, the data server 300 has already completed the access right change procedure for the associated folder.

Figure 13:
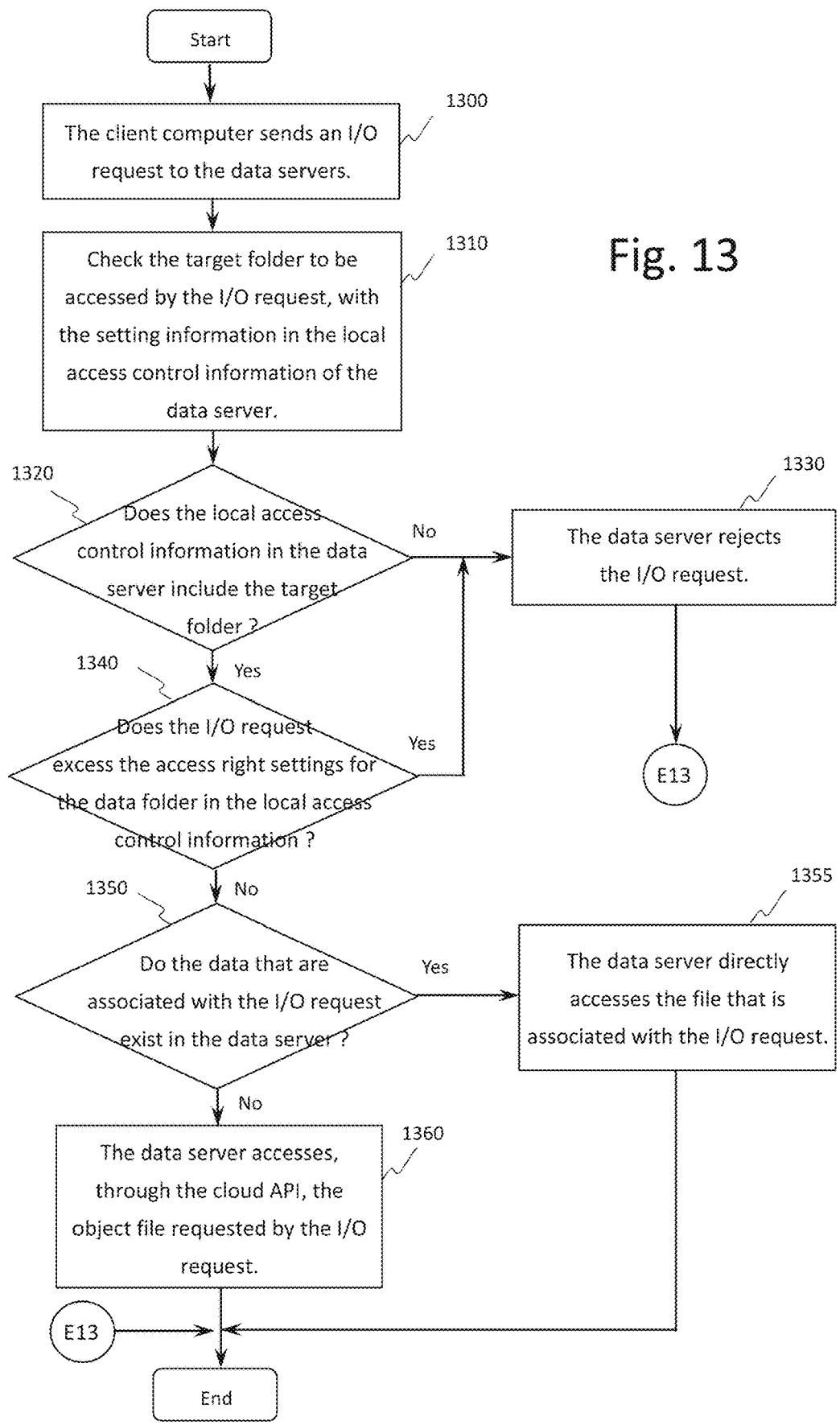
FIG. 13 shows a flowchart of how the data server handles an I/O requests issued from one of the client computers according to one embodiment of the present invention.

Please refer to FIG. 13. FIG. 13 shows a flowchart of how the data server 300 handles I/O requests issued from the client computers 500. According to one embodiment of the present invention, through the network, the client computers 500 are connected to and issue the I/O requests to the data server 300 that provides services to the client computers 500. The data server 300 determines, according to its local access control information 535, whether the I/O requests issued from the client computers 500 can be executed. If the determination is made no, then the data server 300 will reject the I/O requests issued from the client computers 500. If the determination is made yes, then the data server 300 will further determine if the data to be requested by the client computers 500 are stored or cached in any of its internal memories. If the determination is made yes, then the I/O requests are directly executed. If the determination is made no, the data server 300 will according to the I/O requests read the corresponding object file from the cloud or transmit write data of the I/O requests to the cloud for storing. The procedures in FIG. 13 begin with step 1300.

In step 1300, one of the client computers 500 issues an I/O request to the data server 300. In FIG. 2, each of the data servers 300 is connected to the client computers 500 and accepts the I/O requests issued from the client computers 500, the I/O requests of which are going to access the data in the cloud.

In step 1310, the data server 300 checks the target folder to be accessed by the I/O request, with its setting information in the local access control information 535. The setting information in the local access control information 535 is the basis used to determine whether the data server 300 can execute the I/O request or not. The data server 300 determines, according to the local access control information 535, whether the I/O requests should be rejected or executed. According to one embodiment of the present invention, since the local access control information 535 records the settings about the access right of the data server 300 to its associated folders, thus (1) as long as the target folder to be accessed by the I/O requests is not recorded in the local access control information 535 or does not belong to any sub-folder of the parent folders in the record, or (2) as long as the I/O request exceeds the access right of the data server 300 to the folder, the data server 300 will reject the I/O requests. Since the folders recorded in the local access control information 535 may include multiple-layer sub-folders, when the target folder to be accessed by the I/O request belongs to any parent folder in the record, or the target folder to be accessed by the I/O request is the same as one recorded folder, the data server 300 will continue to determine whether the I/O request exceeds the access right to the folder. Taking FIG. 6B as an example, if the client computer 500 that is connected to the data server A 300 issues an I/O request of "a read request to read List.dat in "\Taipei\A\C\US MKT" folder to the data server A 300, the data server A 300 will first determine whether the path of List.dat is included in the path of "\Taipei\A\C\US MKT" or is equal to the path of the "\Taipei\A\C\US MKT", and the path of "\Taipei\A\C\US MKT" refers to the aforesaid target folder.

In step 1320, the data server 300 determines whether the settings of its local access control information 535 include the target folder to be accessed by the I/O request. If the determination is made yes, then step 1340 will be executed. If the determination is made no, then step 1330 will be executed. According to one embodiment of the present invention, when the target folder to be accessed by the I/O request issued from the client computer 500 is included in or is equal to one recorded folder in the local access control information 535, the data server 300 will execute the next determination step.

In step 1340, the data server 300 determines according to the local access control information 535 whether the I/O request exceeds the access right of the data server 300 to the folder, i.e., determining whether the I/O request can access the folder or not. For example, when the I/O request is a write request, and the data server 300 only has a "Read Only" access right to that folder according to the local access control information 535, the I/O request apparently exceeds the access right to the folder. If the determination in step 1340 is made yes, then step 1330 will be executed. If the determination is made no, then step 1350 will be executed.

In step 1350, the data server 300 determines whether the data that are associated with the I/O request, exist in the data server 300 or not. If the determination is made yes, then step 1355 will be executed. If the determination is made no, then step 1360 will be executed.

In step 1355, the data server 300 directly accesses the data requested by the I/O request. Because it is determined that the data to be accessed by the I/O requests already exist in the cache memory of the data server 300, the data server 300 does not need to access the requested object file from the cloud, but just directly executes the I/O request. After completion of executing step 1355, the process flow in FIG. 13 for handling the I/O request issued from the client computer 500 by the data server 300 is ended.

In step 1360, the data server 300 accesses, through the cloud application programming interface 140, the object file requested by the I/O request from the cloud. No matter the I/O request is a read request or a write request, the data server 300 directly accesses the object file from cloud through the cloud application programming interface 140, not through the central data management server. In the present embodiment of the present invention, since there is no need to use the central data management server in the cloud or on the internet, each of the data servers 300 determines, according to the same rule (i.e., the global access control information 92), whether the data server 300 is able to handle the I/O requests issued from the client computers 500 or not. If the data server 300 determines that it is able to handle the I/O request issued from the client computer, then the data server 300 will directly access the object files from the cloud through the cloud application programming interface 140. After completion of executing step 1360, the sub-procedure in FIG. 13 for how the data server 300 handles an I/O request issued from one of the client computers 500 is ended.

Back to the aforesaid steps, when step 1320 determines no, or step 1340 determines yes, the data server 300 will step to step 1330. Step 1330 will be explained as below. The target folder to be accessed by the I/O request is not recorded in the local access control information 535 or is not belong to any parent folder in the record.

In step 1330, the data server 300 rejects the I/O request issued from the client computers 500. As above-mentioned, when the data server 300 determines that (1) there is no such a target folder recorded in the local access control information 535, or the target folder does not belong to any parent folder in the record, or determines that (2) the I/O request exceeds the settings of the access right to the folder in the local access control information 535, if one of these conditions (1) and (2) happens, the data server 300 will reject the I/O request issued from the client computer 500, so that the data access management for the data servers 300 while handling the I/O request issued from the client computer 500 can be achieved. In above descriptions, the determination (1) and determination (2) are made by the access control enforcement unit 530 of the data server 300 in FIG. 4B. In FIG. 4B, the local access control information 535 is included in the access control enforcement unit 530. After completion of executing step 1330, the handling procedure in FIG. 13 which is used by the data server 300 to handle an I/O request issued from one of the client computers 500, is ended.

In these embodiments from FIG. 7 to FIG. 12B, since there is no need to provide a central data management server 30 in the cloud and on the networks to handle the I/O requests issued from the data servers 300, when the data servers 300 handle the I/O requests issued from the client computers 500, the data servers 300 will not use the central data management server 30 to access the object files from the cloud, but uses one same rule (i.e., the global access control information 92) to directly access the user object files from the cloud. In the present invention, it is not necessary for the data servers 300 to spend the time to inquire the central data management server 30 and then to determine whether the data servers 300 can execute the I/O request or not, so that the time is saved and the entire performance of the cloud data storage system 10 can be improved.

Moreover, in these embodiments from above FIG. 7 to FIG. 12B, every time when one of the data servers 300 accesses the user object file from the cloud, the data server 300 will not send any message to one another to inquire whether any of them is accessing the same user object file, so that the entire performance of the cloud data storage system 10 will not be influenced as well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cloud data storage system for managing access authority to a cloud storage, comprising:
   a plurality of data servers for receiving at least one input/output request (I/O request) from at least one client computer and for serving the at least one I/O request, where each of the plurality of data servers comprises:

a central processing unit for processing the at least one I/O request from the at least one client computer and for processing associated data;

a memory unit for temporarily storing the at least one I/O request from the at least one client computer and the associated data; and an access control enforcement unit that executes or rejects the at least one I/O request from the at least one client computer, and comprises a set of local access control information;

a set of cloud data that is located in a cloud storage unit, the set of cloud data comprises:

a plurality of user object files for being accessed by the plurality of data servers in order to serve the at least one I/O request from the at least one client computer, where each of the plurality of user object files respectively corresponds to one of a plurality of folders, and the plurality of folders belong to file systems of the plurality of data servers; and a plurality of metadata object files comprising a set of global access control information and plural sets of status data, for being used by the plurality of data servers, wherein the global access control information is used to record corresponding relationships regarding access rights for the plurality of data servers to the plurality of folders, and each of the plural sets of status data represents a corresponding relationship between one of the plurality of data servers and one of the plurality of folders;

wherein when content of the global access control information is changed, among the plurality of data servers a first data server that is associated with the change detects the disappearance of a first set of status data among the plural sets status data, in which the first set of status data is associated with the first data server, and the first data server downloads the global access control information from the cloud storage unit in order to update the local access control information of the first data server, and handles the at least one I/O request from the at least one client computer according to the updated local access control information.

2. The cloud data storage system according to claim 1, wherein the global access control information comprises a plurality of entries, and each of the plurality of entries records one of the corresponding relationships regarding one of the access rights for one of the plurality of data servers to one of the plurality of folders.

3. The cloud data storage system according to claim 2, wherein each of the plurality of entries further comprises a plurality of fields which store setting information comprising a data server identity (ID), a folder name, and an access right.

4. The cloud data storage system according to claim 2, wherein the plurality of entries further form a table.

5. The cloud data storage system according to claim 1, wherein in the global access control information, for any one of the plurality of folders, only one of the plurality of data servers has a higher access right to the one folder.

6. The cloud data storage system according to claim 5, wherein the higher access right comprises a write access right.

7. The cloud data storage system according to claim 1, wherein the cloud storage unit further comprises a cloud application programming interface (cloud API) which is a data access interface between the cloud storage unit and the plurality of data servers for assisting in command communication when transmitting data.

8. The cloud data storage system according to claim 1, wherein the plurality of data servers are connected to the cloud storage unit through a first network, and the first network is an internet or a local area network.

9. The cloud data storage system according to claim 8, wherein the at least one client computer is connected to the plurality of data servers through a second network, and the second network is an internet or a local area network.

10. The cloud data storage system according to claim 9, wherein the first network and the second network are the same network.

11. The cloud data storage system according to claim 9, wherein the first network is different from the second network.

12. The cloud data storage system according to claim 1, wherein there is no need to use a central management mechanism to manage the access rights in the cloud data storage system when the plurality of data servers make data access to the cloud data.

13. The cloud data storage system according to claim 1, wherein after the plurality of the data servers translate file names of the plurality of user object files, the file names of the plurality of user object files represent a structure corresponding to the plurality of folders.

14. The cloud data storage system according to claim 1, wherein the first data server detects the disappearance of the first set of status data by regularly checking whether or not the first set of status data still exists in the cloud storage unit.

15. The cloud data storage system according to claim 1, wherein the access control enforcement unit refers to the local access control information so as to determine whether or not to execute the I/O request from the at least one client computer.

16. The cloud data storage system according to claim 1, wherein the local access control information is a part of the global access control information or is the whole global access control information.

17. The cloud data storage system according to claim 1, wherein the global access control information is recorded in a positive listing manner that records settings of the access rights for the plurality of data servers to the plurality of folders.

18. The cloud data storage system according to claim 1, wherein the local access control information contained in each of the plurality of data servers records settings of the access right to at least one of the associated folders only for the data server to which the local access control information belongs.

19. The cloud data storage system according to claim 1, wherein by scheduling a higher access right to a first folder of the plurality of folders, a second data server and a third data server of the plurality of data servers take turns to have the higher access right to the first folder in different and non-overlapping time periods.

20. The cloud data storage system according to claim 1, wherein after the first data server detects the disappearance of the first set of status data that are associated with the first data server, and downloads the global access control information, the first data server knows according to the downloaded global access control information that its access right to a second folder of the plurality of folders is given with a higher access right, and the first data server has to wait for a second data server's completion of a handling procedure for releasing the higher access right of the second folder by lowering the access right for itself to the second folder, and then the first data server performs an access right change procedure for the second folder.

21. The cloud data storage system according to claim 1, wherein after the first data server detects the disappearance of the first set of status data that are associated with the first data server, and downloads the global access control information, the first data server knows according to the downloaded global access control information that its access right to a second folder of the plurality of folders is given with a lower access right, and the first data server directly performs an access right change procedure for the second folder.

22. A method for managing access authority to a cloud storage in a cloud data storage system which comprises a plurality of data servers, a set of cloud data located in a cloud storage unit, and a network that is connected to the plurality of data servers and to the cloud data, comprising steps of:
storing a plurality of user object files into the cloud data for being accessed by the plurality of data servers and for serving an I/O request from a client computer, wherein each of the plurality of user object files respectively corresponds to one of a plurality of folders, and the plurality of folders belong to file systems of the plurality of data servers;
storing a plurality of metadata object files into the cloud data that comprise a set of global access control information and plural sets of status data, wherein the global access control information is used to record corresponding relationships regarding access rights for the plurality of data servers to the plurality of folders, and each of the plural sets of status data represents a corresponding relationship between one of the plurality of data servers and one of the plurality of folders;
changing the content of the global access control information;
deleting a first set of status data from the plural sets of status data, wherein the first set of status data represents a corresponding relationship between a first data server of the plurality of data servers and a first folder of the plurality of folders;
downloading the global access control information from the cloud storage unit and updating, according to the downloaded global access control information, a set of local access control information in the first data server; and
handling the I/O request from the client computer according to the updated local access control information.

23. The method according to claim 22, wherein the global access control information comprises a plurality of entries, and each of the plurality of entries records one of the corresponding relationships regarding one of the access rights for one of the plurality of data servers to one of the plurality of folders.

24. The method according to claim 23, wherein each of the plurality of entries further comprises a plurality of fields which store setting information comprising a data server identity (ID), a folder name, and an access right.

25. The method according to claim 23, wherein the plurality of entries further form a table.

26. The method according to claim 22, wherein in the global access control information, for any one of the plurality of folders, only one of the plurality of data servers has a higher access right to the one folder.

27. The method according to claim 26, wherein the higher access right comprises a write access right.

28. The method according to claim 22, wherein there is no need to use a central management mechanism to manage the access rights in the cloud data storage system when the plurality of data servers make data access to the cloud data.

29. The method according to claim 22, wherein after the plurality of data servers translate file names of the plurality of user object files, the file names of the plurality of user object files represent a structure corresponding to the plurality of folders.

30. The method according to claim 22, wherein the step of downloading the global access control information from the cloud storage unit is triggered by an event that the first data server detects the disappearance of the first set of status data that are associated with the first data server.

31. The method according to claim 30, wherein the first data server detects the disappearance of the first set of status data by regularly checking whether or not the first set of status data still exists in the cloud storage unit.

32. The method according to claim 22, wherein the local access control information is a part of the global access control information or is the whole global access control information.

33. The method according to claim 22, wherein the global access control information is recorded in a positive listing manner that records settings of the access rights for the plurality of data servers to the plurality of folders.

34. The method according to claim 22, wherein the local access control information in the first data server only records settings of the access rights to at least one of the associated folders, which is associated with the first data server.

35. The method according to claim 22, wherein by scheduling a higher access right to the first folder, the first data server and a second data server take turns to have the higher access right to the first folder in different and non-overlapping time periods.

36. The method according to claim 22, wherein when the first data server knows according to the downloaded global access control information that its access right to the first folder is given with a higher access right, while the access right of a second data server to the first folder is given with a lower access right from the higher access right, the first data server has to wait for the second data server's completion of an access right change procedure for releasing the higher access right to the first folder, and then the first data server performs the access right change procedure for the first folder.

37. The method according to claim 22, wherein when the first data server knows according to the downloaded global access control information that its access right to the first folder is given with a lower access right, while the access right of a second data server to the first folder is given with a higher access right from the lower access right, the first data server directly performs an access right change procedure for the first folder.

38. The method according to claim 22, further comprising a step of regularly checking by the first data server whether or not the first set of status data exists in the cloud storage unit.

39. The method according to claim 22, further comprising a step of determining whether the access right of the first data server to the first folder is given with a higher access right, when the content of the global access control information is changed.

40. The method according to claim 39, further comprising, when it is determined that the access right of the first data server to the first folder is given with the higher access right, a step of waiting, by the first data server, for a second data server's completion of an access right change procedure for releasing the higher access right of the first folder, and then the first data server handles the I/O request from the client computer according to the updated local access control information.

41. The method according to claim 40, wherein the first data server knows the second data server's completion of the access right change procedure by regularly checking whether or not a second set of status data appears in the cloud storage unit, in which the second set of status data represents a corresponding relationship between the second data server and the first folder.

42. The method according to claim 22, further comprising a step of checking whether there are cache data needed to be uploaded to the cloud storage unit in the first data server, when the content of the global access control information is changed.

43. The method according to claim 42, further comprising, when there are cache data needed to be uploaded to the cloud storage unit in the first data server, a step of uploading the cache data and a message, by the first data server, to the cloud storage unit, in which the message represents the access right for the first data server to the first folder is in transition.

44. The method according to claim 22, further comprising a step of uploading a third set of status data into the cloud storage unit, in which the third set of status data represents a corresponding relationship between the first data server and the first folder, after the first data server completes updating its local access control information.

* * * * *